United States Patent [19]
Voran

[11] Patent Number: 6,092,040
[45] Date of Patent: Jul. 18, 2000

[54] AUDIO SIGNAL TIME OFFSET ESTIMATION ALGORITHM AND MEASURING NORMALIZING BLOCK ALGORITHMS FOR THE PERCEPTUALLY-CONSISTENT COMPARISON OF SPEECH SIGNALS

[76] Inventor: Stephen Voran, 760 Hartford Dr., Boulder, Colo. 80303

[21] Appl. No.: 08/976,341

[22] Filed: Nov. 21, 1997

Related U.S. Application Data

[60] Provisional application No. 60/059,708, Sep. 22, 1997.

[51] Int. Cl.[7] .............................. G10L 11/00; H04L 1/20
[52] U.S. Cl. .......................................... 704/228; 455/67.3
[58] Field of Search .................... 381/58, 94.1; 704/228, 704/233; 455/67.3

[56] References Cited

U.S. PATENT DOCUMENTS

| | | | |
|---|---|---|---|
| 3,637,942 | 1/1972 | Vollmer et al. ......................... | 704/205 |
| 4,791,671 | 12/1988 | Willems .................................. | 704/217 |
| 4,926,488 | 5/1990 | Nadas et al. ............................. | 704/233 |
| 5,007,092 | 4/1991 | Galand et al. ........................... | 704/222 |
| 5,166,924 | 11/1992 | Moose .................................... | 370/289 |
| 5,189,727 | 2/1993 | Guerreri ................................... | 704/231 |
| 5,230,038 | 7/1993 | Fielder et al. ........................... | 704/229 |
| 5,255,339 | 10/1993 | Fette et al. ............................... | 704/200 |
| 5,274,711 | 12/1993 | Rutledge et al. ........................ | 704/225 |
| 5,323,459 | 6/1994 | Hirano .................................... | 379/391 |
| 5,377,301 | 12/1994 | Rosenberg et al. ...................... | 704/222 |
| 5,402,495 | 3/1995 | Kim ....................................... | 381/94.1 |
| 5,446,492 | 8/1995 | Wolf et al. .............................. | 348/192 |
| 5,559,881 | 9/1996 | Sih ......................................... | 379/410 |
| 5,563,953 | 10/1996 | Kwon ..................................... | 381/58 |
| 5,577,161 | 11/1996 | Pelaez Ferrigno ...................... | 704/226 |
| 5,596,364 | 1/1997 | Wolf et al. .............................. | 348/192 |
| 5,621,854 | 4/1997 | Hollier ................................... | 704/228 |
| 5,623,577 | 4/1997 | Fielder ................................... | 704/229 |
| 5,625,743 | 4/1997 | Fiocca .................................... | 704/205 |
| 5,682,463 | 10/1997 | Allen et al. ............................. | 704/230 |
| 5,752,223 | 5/1998 | Aoyagi et al. .......................... | 704/219 |

OTHER PUBLICATIONS

"Estimation of audio delays", Voran, Committee T1 Performance Standards Contribution, Jun. 3, 1996, Document No. T1A1.5/96–111.

"Additional information on proposed objective quality measure . . . " Atkinson, D.J. and Voran, S. Committee T1—Telecommunications Standards Contribution, May 4, 1997, Doc. No. T1A1.7/97–0003R1.

*Primary Examiner*—David R. Hudspeth
*Assistant Examiner*—Tálivaldis Ivars Šmits
*Attorney, Agent, or Firm*—Robert Platt Bell

[57] ABSTRACT

An audio signal time offset estimation algorithm estimates a time offset between two audio signals. The audio signal time offset estimation algorithm provides a way to measure that delay, even when the audio equipment causes severe distortion, and the signal coming out of the equipment sounds very different from the signal going in. Normalizing block algorithms provide perceptually consistent comparison of speech signals. These algorithms compare the sounds of two speech signals in a way that agrees with human auditory perception. This means, for example, that when these algorithms indicate that two speech signals sound identical, it is very likely that persons listening to those speech signals would describe them as identical. When these algorithms indicate that two speech signals sound similar, it is very likely that persons listening to those speech signals would describe them as similar.

66 Claims, 8 Drawing Sheets

AUDIO SIGNAL TIME OFFSET ESTIMATION ALGORITHM AND MEASURING NORMALIZING BLOCK ALGORITHMS FOR THE PERCEPTUALLY-CONSISTENT COMPARISON OF SPEECH SIGNALS

CROSS-REFERENCE TO RELATED APPLICATIONS

This application claims priority from Provisional U.S. patent applications Ser. No. 60/059,708, filed Sep. 22, 1997, and incorporated herein by reference.

FIELD OF THE INVENTION

A first portion of the present invention is directed toward an audio signal time offset estimation algorithm for estimating delay between an input and output signal of a piece of audio equipment (e.g., telephone equipment or the like). A second portion of the present invention is directed toward an algorithm which provides perceptually consistent comparison of speech signals.

BACKGROUND OF THE INVENTION

Audio signal time offset refers to the delay introduced into an audio signal by a piece of audio equipment such as telephone equipment. Determining audio signal time offset is useful as audio time offsets occur in many different types of audio equipment. These time offsets are often important to those who use that equipment, but there is often no effective way to accurately measure these time offsets. Potential users of this algorithm include persons who design, build, test and use audio equipment. Examples include telephone, cellular telephone, personal communications, and satellite service providers, equipment manufacturers, and users. Further examples include those who make, install and use digital audio encoders and decoders.

Conventional techniques for measuring such delay may be hampered where the audio signal is distorted or otherwise altered by the audio equipment itself. It may be difficult to compare the input and output audio signals when the two signals are no longer identical due to distortion or alteration induced by the audio equipment.

In evaluating audio equipment, it may be useful to determine whether an output audio signal is perceived as identical or nearly identical to an input audio signal. Of course, it is a simple matter using electronic tools to determine whether an output audio signal is electronically identical to an input audio signal. However, in many applications, particularly telephony, it may be more useful to determine whether the average listener perceives an output audio signal to be identical or nearly identical to an input audio signal. An output audio signal may be perceived as being identical or nearly identical to an input audio signal even if significant distortion or alteration to the input audio signal takes place. Since, in application, perception is paramount, it may be possible to build audio equipment which introduces significant distortion without degradation of the perceived output audio signal.

Traditionally, measuring perception of an output audio signal was a time-consuming manual process. A number of audio signals may be played for a sampled cross-section of listeners, and each listener asked to evaluate each audio signal. The evaluations of each listener may be compiled and averaged, and each audio signal rated in terms of its perception. Such a technique, in addition to being time-consuming and costly, may also be inaccurate. For example, one must insure that the listeners sampled represent a cross-section of the spectrum of the hearing abilities of the average listener. Moreover, human variation in scoring such perceptional based evaluations may introduce additional error.

Heretofore, there has not been a technique for electronically evaluating an output signal to determine human perception in a consistent manner.

SUMMARY OF THE INVENTION

In a first portion of the present invention, an audio signal time offset estimation algorithm estimates a time offset between two audio signals. The audio signal time offset estimation algorithm provides a way to measure that delay, even when the audio equipment causes severe distortion, aand the signal coming out of the equipment sounds very different from the signal going in. The audio signal time offset estimation algorithm may have particular application in a second portion of the present invention, where such audio signal time offset estimation may be used in an algorithm for perceptually consistent comparison of speech signals.

In a second portion of the present invention, normalizing block algorithms are disclosed to provide perceptually consistent comparison of speech signals. These algorithms compare the sounds of two speech signals in a way that agrees with human auditory perception. This means, for example, that when these algorithms indicate that two speech signals sound identical, it is very likely that persons listening to those speech signals would describe them as identical. When these algorithms indicate that two speech signals sound similar, it is very likely that persons listening to those speech signals would describe them as similar. Finally, when these algorithms indicate that two speech signals sound very different, it is very likely that persons listening to those speech signals would describe them as very different.

These algorithms are valuable because there are many instances where speech signals must be compared, and having persons listen to them is often not a practical option. Examples include automatic speech recognition and automatic speaker recognition tasks. A further example is the task of evaluating the quality of speech produced by some speech processing equipment, perhaps a piece of the telephone system. In many cases, when the speech that goes into and the speech that comes out of a piece of speech processing equipment are similar, that equipment has high speech quality, while if they are very different, that equipment has low speech quality. Potential users of this algorithm include persons who design, build, test and use speech equipment. Examples include telephone, cellular telephone, personal communications, and satellite service providers, equipment manufacturers, and users. Further examples include those who make, install and use digital speech encoders and decoders.

BRIEF DESCRIPTIONS OF THE DRAWINGS

DETAILED DESCRIPTION OF THE INVENTION

Figure 1:
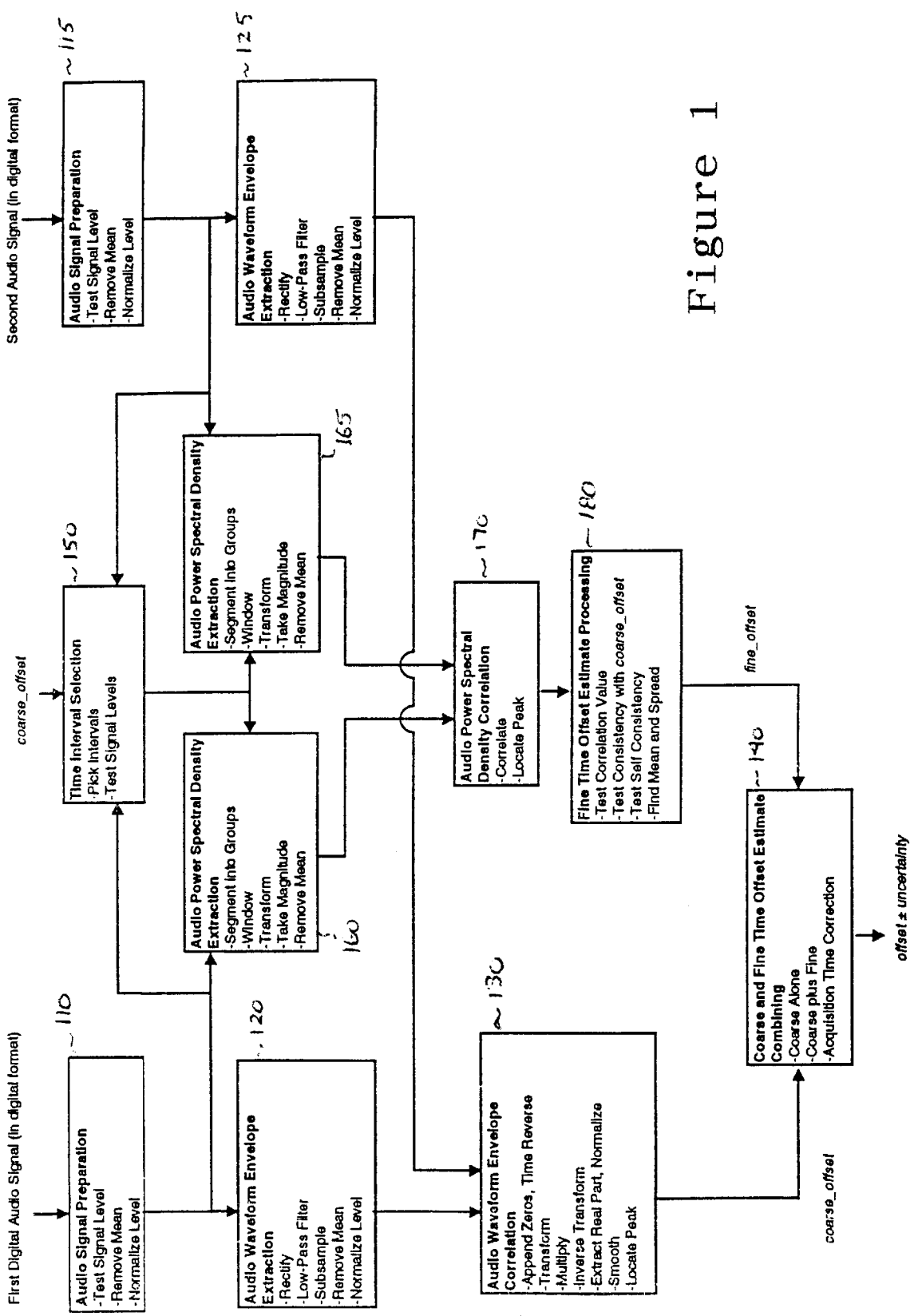
FIG. 1 is a block diagram illustrating the steps in the audio signal time offset estimation algorithm.

The present invention comprises two components; an audio signal time offset estimation algorithm and measuring normalizing block algorithms for the perceptually consistent comparison of speech signals. The latter portion of the present invention, in the preferred embodiment, incorporates the audio signal time offset estimation algorithm, and that algorithm is disclosed here to comply with best mode requirements. The audio signal time offset estimation algorithm discussed herein was disclosed to the telecommunications standards groups T1A1.7 and T1A.5 on Jun. 1, 1996. Other audio signal time offset estimation algorithms may be utilized with the method for measuring normalizing block algorithms of the present invention, without departing from the spirit and scope thereof.

AUDIO SIGNAL TIME OFFSET ESTIMATION ALGORITHM

In the detailed description of the present invention, the following variables are defined:

| | |
|---|---|
| acquisition_offset: | acquisition time of the second audio signal relative to the first audio signal |
| B: | bandwidth reduction factor and subsampling factor |
| coarse_offset: | offset as estimated by coarse stage |
| cross_corr: | temporary array, ultimately holds cross-correlation values |
| cross_corr(i): | ith element of cross-corr array |
| cross_corr_s: | smoothed version of cross-corr in coarse stage |
| cross_corr_s(i): | $i^{th}$ element of cross_corr_s array |
| offset: | final output of the algorithm |
| fine_offset: | offset as estimated by fine stage |
| fine_offset_k: | $k^{th}$ fine offset estimate |
| L1: | number of audio samples input to algorithm from each audio signal |
| L2: | number of audio samples after subsampling |
| location: | location where fine stage makes an estimate |
| n1: | number of estimates made by fine stage |
| n2: | number of fine stage estimates retained after first test |
| n3: | number of fine stage estimates retained after second test |
| n4: | number of fine stage estimates retained after third test |
| ref: | array of audio samples from first audio signal |
| ref(i): | $i^{th}$ element of ref array |
| ref_temp: | temporary storage array for audio samples as they are processed |
| ref_temp(i): | $i^{th}$ element of ref_temp array |
| ref_temp_i: | temporary storage array for audio samples as they are processed |
| ref_temp_i(j): | $j^{th}$ element of ref_temp_i array |
| sample_rate: | the audio sample rate associated with the digital audio format used by the algorithm |
| spread: | spread in the final subset of fine offset estimates |
| test: | array of audio samples from second audio signal |

-continued

| | |
|---|---|
| test(i): | $i^{th}$ element of test array |
| test_temp: | temporary storage array for audio samples as they are processed |
| test_temp(i): | $i^{th}$ element of test_temp array |

One application of this algorithm is the situation where a first audio signal is the input to an audio transmission or storage device, and a second audio signal is the (possibly distorted) output of that of an audio transmission or storage device. The time offset estimated by this algorithm will be positive, and it will indicate the time delay introduced by the audio transmission or storage device.

Many audio transmission or storage devices distort audio waveforms moderately or severely. This means that an algorithm which estimates time offsets created by these audio transmission or storage devices must not rely on undistorted audio waveforms. The algorithm described here relies on audio waveform envelopes and audio power spectral densities. Both of these are always less distorted than audio waveforms.

The algorithm comprises a coarse stage which generates a coarse estimate of the time offset between two audio signals. A fine stage generates a fine estimate of the time offset between the two audio signals. The coarse stage bases its estimates on audio waveform envelopes, and the fine stage bases its estimates on audio power spectral densities. Each stage involves a search over a range of possible time offsets. Whenever possible, the fine estimate of time offset is used to refine the coarse estimate of time offset.

The two stage process is efficient because the coarse stage can search a wide range of time offsets, but at low resolution. If that same range were searched at high resolution, many more computations would be required. Once the coarse stage has finished its work, its low-resolution estimate can often be refined to a high-resolution estimate by the fine stage that follows. The fine stage needs to search only a narrow range of time offsets, consistent with the uncertainty of the coarse estimate.

Because this algorithm is a digital signal processing algorithm, it requires that the two audio signals of interest be in a digital format. The audio sample rate associated with this digital format is determined by the bandwidth required for the subsequent estimates. For audio signals that are limited to speech, an audio sample rate of 8000 samples per second is sufficient. For other audio signals, higher audio sample rates may be required. The digital format should have at least 8 bits of precision for each sample. For some audio signals, additional precision up to 16 bits per sample may be advantageous.

When programmed into a digital computer or other digital signal processing apparatus known in the art, the audio signal time offset estimation algorithm provides a method and apparatus for accurately determining time offset between an input and output signal, even when the output signal is distorted or otherwise altered.

AUDIO SIGNAL PREPARATION

FIG. 1 is a block diagram illustrating the steps in the audio signal time offset estimation algorithm of the present invention.

The number of audio samples used in the algorithm is important. The use of more audio samples increases both the reliability and the number of computations required by the algorithm. If the audio samples contain only silence (e.g. between words or phrases in a spoken conversation), it may be difficult to generate a reliable estimate of time offset, and additional audio samples should be used.

As illustrated in block 110, to detect an insufficient audio signal level condition, the Root Mean-Squared (RMS) level of the audio samples of the first audio signal should be compared with the nominal RMS level of the first audio signal.

If the RMS level of these samples is more than 30 decibels (dB) below the nominal RMS level of the first audio signal, then additional audio samples should be used.

Similarly, in block 115, the RMS level of the audio samples of the second audio signal should be compared with the nominal RMS level of the second audio signal. If the RMS level of these samples is more than 30 dB below the nominal RMS level of the second audio signal, then additional audio samples should be used.

For audio signals that are limited to speech, it is preferred that about 4 seconds of each audio signal be used in this algorithm. The algorithm will also work for other audio signals of other durations. The estimates generated by this algorithm are most reliable when the audio signals have a duration that is at least 4 times as long as the time offset between the two audio signals. The algorithm is most efficient when signal durations are chosen so that the Discrete Fourier Transforms (DFTs) that follow operate on a number of audio samples that is a power of two. In that event, the DFTs can be replaced with Fast Fourier Transforms (FFTs).

In block 110, the audio samples from the first audio signal are placed in an array call ref, which contains samples ref(1), ref(2), . . . ref(L1). In block 115, the audio samples from the second audio signal are placed in an identically sized array called test, which contains samples test(1), test (2), . . . test (L1). The mean value of each array is then removed in order to eliminate any DC component in the digitized audio signals:

$$ref(i) = ref(i) - \frac{1}{L1} \cdot \sum_{j=1}^{L1} ref(j), \quad 1 \le i \le L1.$$

$$test(i) = test(i) - \frac{1}{L1} \cdot \sum_{j=1}^{L1} test(j), \quad 1 \le i \le L1.$$

Next, each array is normalized to a common RMS level:

$$ref(i) = ref(i) \cdot \left[ \frac{1}{L1-1} \sum_{j=1}^{L1} (ref(j))^2 \right]^{-1/2}, \quad 1 \le i \le L1.$$

$$test(i) = test(i) \cdot \left[ \frac{1}{L1-1} \sum_{j=1}^{L1} (test(j))^2 \right]^{-1/2}, \quad 1 \le i \le L1.$$

Audio Waveform Envelope Extraction

Audio waveform envelopes for first and second audio signals are calculated in blocks 120 and 125, respectively, as follows. The audio samples in ref and test are rectified by taking the absolute value of each sample. Because the original digitized audio signals in ref and test will be required by the fine stage, the rectified signals, and other subsequent intermediate results are stored in the temporary arrays ref_temp and test_temp:

ref_temp(i)=|ref(i)|,      $1 \le i \le L1$ test_temp(i)=|test(i)|,      $1 \le i \le L1$ The rectified signals are then low-pass filtered to create audio envelopes with a bandwidth of approximately 125 Hertz(Hz). It is this low-pass filtering and subsequent subsampling that gives the coarse stage its reduced resolution and reduced computational load. The bandwidth reduction factor and the subsampling factor are both specified by the variable B. Appropriate values of B for some common audio sample rates are given in Table 1.

TABLE 1

| Audio Sample Rate (samples/second) | B |
| --- | --- |
| 8,000 | 32 |
| 16,000 | 64 |
| 32,000 | 128 |
| 44,100 | 176 |
| 48,000 | 192 |

When the audio sample rate is 8,000 samples per second, the bandwidth must be reduced by a factor of B=32, from a nominal bandwidth of 4000 Hz to a nominal bandwidth of 125 Hz. The required bandwidth reduction can be adequately approximated using a seventh order, Infinite Impulse Response, low-pass filter with a −3 dB point at 125 Hz. The direct-form implementation is:

$$out(i) = \sum_{j=0}^{7} b_j \cdot in(i-j) - \sum_{j=1}^{7} a_j \cdot out(i-j), \quad 1 \le i \le L1,$$

where out (i)=in (i)=0, $i \le 0$

As an example, one set of filter coefficients for the case B=32 are given in Table 2. Similar filters can be used for other values of B.

TABLE 2

| j | $a_j$ | $b_j$ |
| --- | --- | --- |
| 0 | 1.00000000 | 0.00553833 × 10⁻⁷ |
| 1 | −6.55883158 | 0.03876830 × 10⁻⁷ |
| 2 | 18.44954612 | 0.11630512 × 10⁻⁷ |
| 3 | −28.85178274 | 0.19384125 × 10⁻⁷ |
| 4 | 27.08958968 | 0.19384206 × 10⁻⁷ |
| 5 | −15.27097592 | 0.11630465 × 10⁻⁷ |
| 6 | 4.78557610 | 0.03876843 × 10⁻⁷ |
| 7 | −0.64312159 | 0.00553831 × 10⁻⁷ |

Both the ref_temp and test_temp arrays are low-pass filtered using the chosen bandwidth reduction filter. Care must be taken to eliminate any filter output samples that might contain a filter start-up transient. Next ref_temp and test_temp are subsampled by retaining only every $B^{th}$ sample, resulting in a total of L2 samples. For example, when the audio sample rate is 8000 samples per second and the signal duration is 4.096 seconds, L1=32,768 samples.

If B=32, samples 1, 33, 65, and the like, would be retained and L2=L1/B, or 32,768/32=1024 samples would result from the subsampling process. Both ref_temp and test_temp now contain audio waveform envelopes. Finally, the audio waveform envelopes in ref_temp and test_temp are normalized as illustrated in blocks 120 and 125, respectively. The mean value of each array is removed, and each array is divided by its standard deviation to normalize each to a common RMS level.

$$ref\_temp(i) = ref\_temp(i) - \frac{1}{L2} \cdot \sum_{j=1}^{L2} ref\_temp(j),$$

$$test\_temp(i) = test\_temp(i) - \frac{1}{L2} \cdot \sum_{j=1}^{L2} test\_temp(j),$$

$$ref\_temp(i) = ref\_temp(i) \cdot \left[\frac{1}{L2-1}\sum_{j=1}^{L2} ref\_temp(j)^2\right]^{-1/2},$$

$$test\_temp(i) = test\_temp(i) \cdot \left[\frac{1}{L2-1}\sum_{j=1}^{L2} test\_temp(j)^2\right]^{-1/2},$$

$$1 \le i \le L2.$$

Audio Waveform Envelope Cross-Correlation

The cross-correlation between the audio waveform envelopes in ref temp and test-temp is calculated by way of a circular convolution, which in turn is calculated by way of Discrete Fourier Transforms (DFTs or Fast Fourier Transforms (FFTs) as illustrated in block 130. First the array ref_temp is extended from length L2 to length 2·L2 by appending L2 zeros. In the example above, L2=1024 zeros would be added to arrive at a final array size of 2048.

Next, the array test_temp is time-reversed. To do this in-place, samples 1 and L2 of test_temp are exchanged, as are samples 2 and L2-1, samples 3 and L2-2, and so forth. When L2 is even, the final exchange is between samples L2/2 and L2/2 +1. When L2 is odd, the final exchange is between samples L2/2 - 1/2, and L2/2+3/2. After this time reversal, test_temp is extended from length L2 to length 2 L2 by appending L2 zeros.

Now ref_temp and test_temp are transformed using DFTs or FFTs. When the array length, 2·L2, is a power of two, FFTs can be used. If 2·L2 is not a power of two, DFTs can be used. As an alternative, the number of zeros appended in the previous step may be increased so that the array length is a power of two and FFTs may then be used. In any case, an in-place transformation algorithm may be used, resulting in transformed versions of ref_temp and test_temp overwriting the previous versions. The transformations result in complex numbers.

Next, the complex samples stored in ref temp and test-temp are multiplied, sample by sample, and the complex results go into a new array called cross_corr, which has the same length as ref_temp and test_temp:

cross_corr(i)=ref_temp(i) test_temp(i), for i=1 to 2·L2.

The array cross_corr is now Inverse Fast Fourier Transformed or Inverse Discrete Fourier Transformed, as dictated by its length. An in-place transformation may be used. In theory, the resulting contents of cross_corr would be real numbers. In practice, finite-precision calculations yield a small imaginary component. At this point, the real part of cross_corr is retained and the imaginary part is discarded. Next, each result in cross_corr is normalized:

cross_corr(i)=cross_corr(i)/(L2-1), $1 \le i \le 2 \cdot L2$.

Note that this normalization is required in order to get true cross-correlation values between −1 and +1, but it does not affect the smoothing or peak-finding steps that follow.

The array cross corr holds the values of the cross-correlations between the audio waveform envelopes in ref_temp and test_temp at every possible time offset of those envelopes. These results are then smoothed with a symmetric, second-order, low-pass FIR filter, and stored in a smoothed cross-correlation array:

$$cross\_corr\_s(i) = .25 \cdot cross\_corr(i-1) +$$
$$.5 \cdot cross\_corr(i) + .25 \cdot cross\_corr(i+1), \quad 2 \le i \le 2 \cdot L2 - 1,$$
$$cross\_corr\_s(i) = cross\_corr(i), \quad i = 1, 2 \cdot L2.$$

After this smoothing, the largest value in cross_corr_s is used to generate the coarse estimate of the time offset between the two audio signals.

coarse_offset=(L2-j)·B samples, where:

cross_corr_s(j)>cross_corr_s(i), $1 \le i \le 2 \cdot L2$, $i \ne j$.

The uncertainty in the value of coarse_offset at this point is taken to be ±B samples. If cross_corr_s does not contain a unique maximal value, then the algorithm must be repeated using new audio samples.

Time Interval Selection

As illustrated in step 150, fine estimates of time offset are calculated in n1 different time intervals in each of the two audio signals. When audio signals are limited to speech and the signal durations are approximately 4 seconds, then the preferred value of n1 is 6. Other values of n1 may be more appropriate for other audio signals. At each selected time interval, a range of potential time offset values from −3·B to 3·B samples is searched. These time offset values are relative to the coarse time offset estimate that has been completed.

To create each of these n1 time intervals, 8·B samples are taken from the array ref and are stored in ref_temp and 2B samples are taken from the array test and are stored in test_temp. The samples taken from test are offset by the coarse estimate of time offset:

$$ref\_temp(i) = ref(location - 4 \cdot B - 1 + i), \quad 1 \le i \le 8 \cdot B,$$
$$test\_temp(i) = test(location + coarse\_offset - B - 1 + i),$$
$$1 \le i \le 2 \cdot B,$$

where location is a uniformly distributed pseudo-random variable integer from the interval:

[max(4·B+1, 1-coarse_offset+B), min (L1−4·B+1, L1-coarse_offset-B+1)].

Level tests are then conducted to insure that the audio signal levels in these selected intervals are within 30 dB of the average audio signal level:

$$-30 \le 10 \cdot \log_{10}\left[\frac{1}{8 \cdot B - 1}\sum_{i=1}^{8 \cdot B} ref\_temp(i)^2\right],$$

$$-30 \le 10 \cdot \log_{10}\left[\frac{1}{2 \cdot B - 1}\sum_{i=1}^{2 \cdot B} test\_temp(i)^2\right].$$

If either of the level tests is failed, then a new value of location must be selected. These steps are repeated until n1 time intervals that pass both of the level tests have been identified.

Audio Power Spectral Density Extraction

Audio power spectral density extraction for the first and second digital audio signals are performed in blocks 160 and 165, respectively. For each of the n1 time intervals, the audio power spectral densities are calculated as follows. The 8·B samples in ref_temp are broken into groups of 2·B samples per group. There are 6·B+1 such groups. Each group of samples is stored in an array called ref_temp_i:

ref_temp_i(j)=ref_temp(i+j−1), $1 \leq i \leq 6 \cdot B+1$, $1 \leq j \leq 2 \cdot B$.

Each ref_temp_i array and the test_temp array is multiplied by a time-domain window, and then transformed to the frequency domain using a length 2·B DFT or FFT. These steps can be done in place:

$$ref\_temp\_i(j) = ref\_temp\_i(j) \cdot \{.54 - .46 \cdot \cos(2\pi(j-1)/(2 \cdot B - 1))\},$$

$$1 \leq i \leq 6 \cdot B + 1, \ 1 \leq j \leq 2 \cdot B,$$

$$test\_temp(j) = test\_temp(j) \cdot \{.54 - .46 \cdot \cos(2\pi(j-1)/(2 \cdot B - 1))\},$$

$$1 \leq j \leq 2 \cdot B,$$

$$ref\_temp\_i = DFT(ref\_temp\_i), \ 1 \leq i \leq 6 \cdot B + 1,$$

$$test\_temp = DFT(test\_temp).$$

In the frequency domain, only the first B+1 complex samples in each array are unique, so only those samples are saved. The magnitude of each retained sample is taken, resulting in the square root of the audio power spectral density of each frame. These results are referred to as Power Spectral Densities or PSDs.

ref_temp_i(j)=|ref_temp_i(j)|, $1 \leq i \leq 6 \cdot B+1$, $1 \leq j \leq B+1$,
test_temp (j)=|test_temp(j)|, $1 \leq j \leq B+1$.

The mean value of each PSD is then removed:

$$ref\_temp\_i(j) = ref\_temp\_i(j) - \frac{1}{B+1} \cdot \sum_{j=1}^{B+1} ref\_temp\_i(j),$$

$$1 \leq i \leq 6 \cdot B + 1, \ 1 \leq j \leq B + 1,$$

$$test\_temp(j) = test\_temp(j) - \frac{1}{B+1} \cdot \sum_{j=1}^{B+1} test\_temp(j),$$

$$1 \leq j \leq B + 1.$$

Audio Power Spectral Density Cross-Correlation

As illustrated in block 170, for each of the n1 time intervals, a cross-correlation value is calculated between the PSD stored in the test_temp array and each of the 6·B+1 PSDs stored in the ref_temp_i arrays.

$$cross\_corr(i) = \frac{\left(\sum_{j=1}^{B+1} ref\_temp\_i(j) \cdot test\_temp(j)\right)}{\left(\sum_{j=1}^{B+1} ref\_temp\_i(j)^2\right)^{1/2} \left(\sum_{j=1}^{B+1} test\_temp(j)^2\right)^{1/2}},$$

$$1 \leq i \leq 6 \cdot B + 1.$$

The array cross_corr now holds the values of the cross correlations between the reference and test PSDs at each time offset. Note that the second term in the denominator of the equation for cross_corr is a normalizing constant that is required to get true cross-correlation values between −1 and +1. It does not have any impact on the peak-finding that follows, but does impact subsequent processing of the fine time offset estimates. The largest value in cross_corr is used to generate the fine estimate of the time offset between the two audio signals:

fine_offset_k=(3·B+1)−j samples,
corr_k=cross_corr(j), $1 \leq k \leq n1$,
where
cross_corr(j)>cross_corr(i), $1 \leq i \leq 6 \cdot B+1$, $i \neq j$.

If cross-corr does not contain a unique maximal value, then a new value, of location must be selected and the Audio Power Spectral Density Extraction and Audio Power Spectral Density Correlation algorithms must be repeated.

When n1 fine time offset estimates have been completed, they will be stored in fine_offset_1, fine_offset_2, . . . fine_offset n1. The n1 corresponding correlation values are stored in corr_1, corr_2, . . . corr_n1, respectively. Note that each of the fine time offset estimates will fall between −3·B and 3·B samples, inclusive.

Fine Time Offset Estimate Processing

As illustrated in block 180, once the n1 fine time offset estimates and corresponding cross-correlation values have been calculated, they are further processed to determine how they should be used.

First, each of the n1 correlation values are tested against a threshold:

$$\sqrt{1/2} \leq corr\_k \Rightarrow fine\_offset\_k \text{ is retained}, \ 1 \leq k \leq n1.$$

By this process, only fine time offset estimates where at least half the PSD variance is accounted for are retained. The number of fine time offset estimates that pass this test is n2, and the estimates are now renumbered as fine_offset_1, fine_offset_2, . . . fine_offset_n2. If n2<n1/2, this to processing will not produce a useful final fine time offset estimate. In this event, the value of fine_offset is set to "invalid" and the fine Time Offset Estimate Processing algorithm is terminated.

If n2≧n1/2, the Fine Time Offset Estimate Processing algorithm continues and tests the remaining n2 fine time offset estimates for consistency with the coarse time offset estimate. Since the uncertainty in the coarse time offset estimate is ±B samples, and the coarse time offset estimate has been removed, only fine time offset estimates between ·B and B samples are retained:

|fine_offset_k|≦B→fine_offset_k is retained, $1 \leq k \leq n2$.

The number of fine time offset estimates that pass this test is n3, and the estimates are now renumbered as fine_offset_1, fine_offset_2, . . . fine_offset_n3. If n3<n1/2, this processing will not produce a useful final fine time offset estimate. In this event, the value of fine_offset is set to "invalid" and the Fine Time Offset Estimate Processing algorithm is terminated.

If n3≧n1/2, the Fine Time Offset Estimate Processing algorithm continues and tests for consistency among the remaining n3 fine time offset estimates. This test requires a search through all possible subsets of size n3, n3-1, on down to size n1/2. There is one possible subset of size n3, n3-1 possible subsets of size n3-1, n3·(n3-1)/2 possible subsets of size n3-2, and so forth. For each subset, the spread of the fine time offset estimates is tested:

$$\max_i\{fine\_offset\_i\} - \min_i\{fine\_offset\_i\} \leq \frac{B}{2},$$

fine_offset_i ∈ current subset

The largest subset that passes this test is called the final subset. If there is not a unique largest subset that passes this test, then this processing will not produce a useful final fine time offset estimate. In this event, the value of fine_offset is set to "invalid" and the Fine Time Offset Estimate Processing algorithm is terminated.

The number of fine time offset estimates in the final subset is n4. These n4 fine time offset estimates are now renumbered as fine_offset_1, fine_offset_2, . . .fine_offset_n4. The mean value of these n4 fine time offset estimates is taken as the final time offset estimate:

$$fine\_offset = \frac{1}{n4} \cdot \sum_{i=1}^{n4} fine\_offset\_i.$$

The spread of the n4 estimates in the final subset is retained as a measure of uncertainty in the final time offset estimate:

$$spread = \max_i \{fine\_offset\_i\} - \min_i \{fine\_offset\_i\},$$

$$fine\_offset\_i \in \text{final subset}$$

Coarse and Fine Time Offset Estimate Combining

In block 140, coarse and fine offsets are combined. fine_offset has been set to "invalid", then the coarse time offset estimate alone becomes the final time offset estimate. If fine_offset has not been set to "invalid," then the coarse time offset estimate is augmented by that fine time offset estimate and the uncertainty is reduced from that of the coarse time offset estimate alone:

fine_offset="invalid"→offset=coarse offset±B samples,
fine_offset≠"invalid"→offset=coarse_offset+fine_offset±spread samples.

This value of offset is correct only when the corresponding samples of the two digital audio signals were originally acquired at the same time instant. If they were not acquired at the same time instant, then the value of offset must be converted from samples to seconds, and corrected by the known offset in the acquisition times, in second:

offset=offset / sample_rate seconds, offset=offset+acquisition_offset seconds.

Thus, an offset value may be accurately and quickly determined with a minimal number of calculation steps. Note that each block in FIG. 1 may represent a step in a computer program or the like, or a portion of a computer program. Alternately, each block in FIG. 1 may represent a separate element in an apparatus for determining such a time offset value. The method and apparatus of FIG. 1 may be useful for many applications as noted above, but may have particular application to a technique for perceptually consistent comparison of speech signals.

MEASURING NORMALIZING BLOCK ALGORITHMS FOR THE PERCEPTUALLY-CONSISTENT COMPARISON OF SPEECH SIGNALS

The digital signal processing algorithms described here use Measuring Normalizing Blocks (MNBs) to measure the differences between two telephone bandwidth speech signals in a way that is consistent with human auditory perception and judgment. Nominal telephone bandwidth is approximately 300 Hz to 3400 Hz. Each algorithm generates a single, non-negative output value called Auditory Distance (AD).

Figure 3:
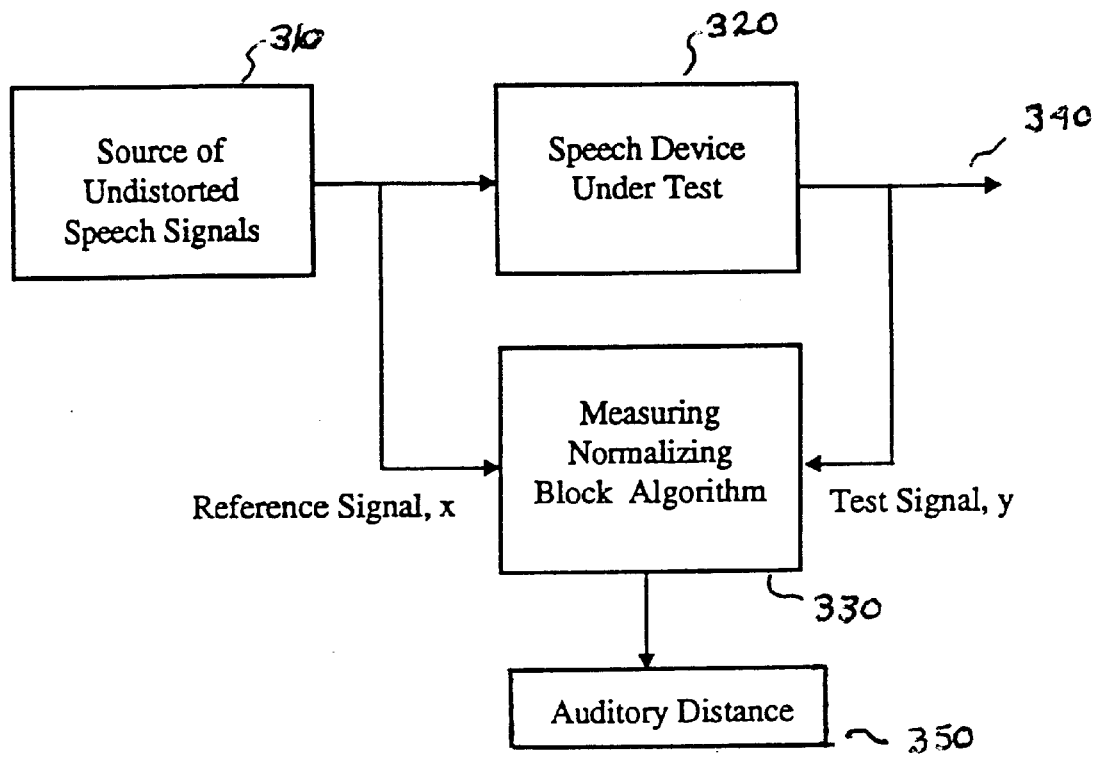
FIG. 3 is a block diagram illustrating an application of the technique of FIG. 2.

AD is an estimate of the perceived differences between the two speech signals. One application of these algorithms is illustrated in FIG. 3. In the example of FIG. 3, the two speech signals are input signal 310 to and output signal 340 from a speech device under test 320 (DUT).

Thus, AD 350 is a measure of the perceived differences or distortion induced by DUT 320. In the situation described in FIG. 3, AD 350 is closely related to the perceived speech quality of DUT 320. If DUT 320 is not changing the speech signal in perceptually significant ways, then AD 350 will be small, and the speech quality will be high. If DUT 320 begins to change the speech signal in ways that are more noticeable or more objectionable, then AD 350 will increase, and the speech quality will decrease.

Figure 2:
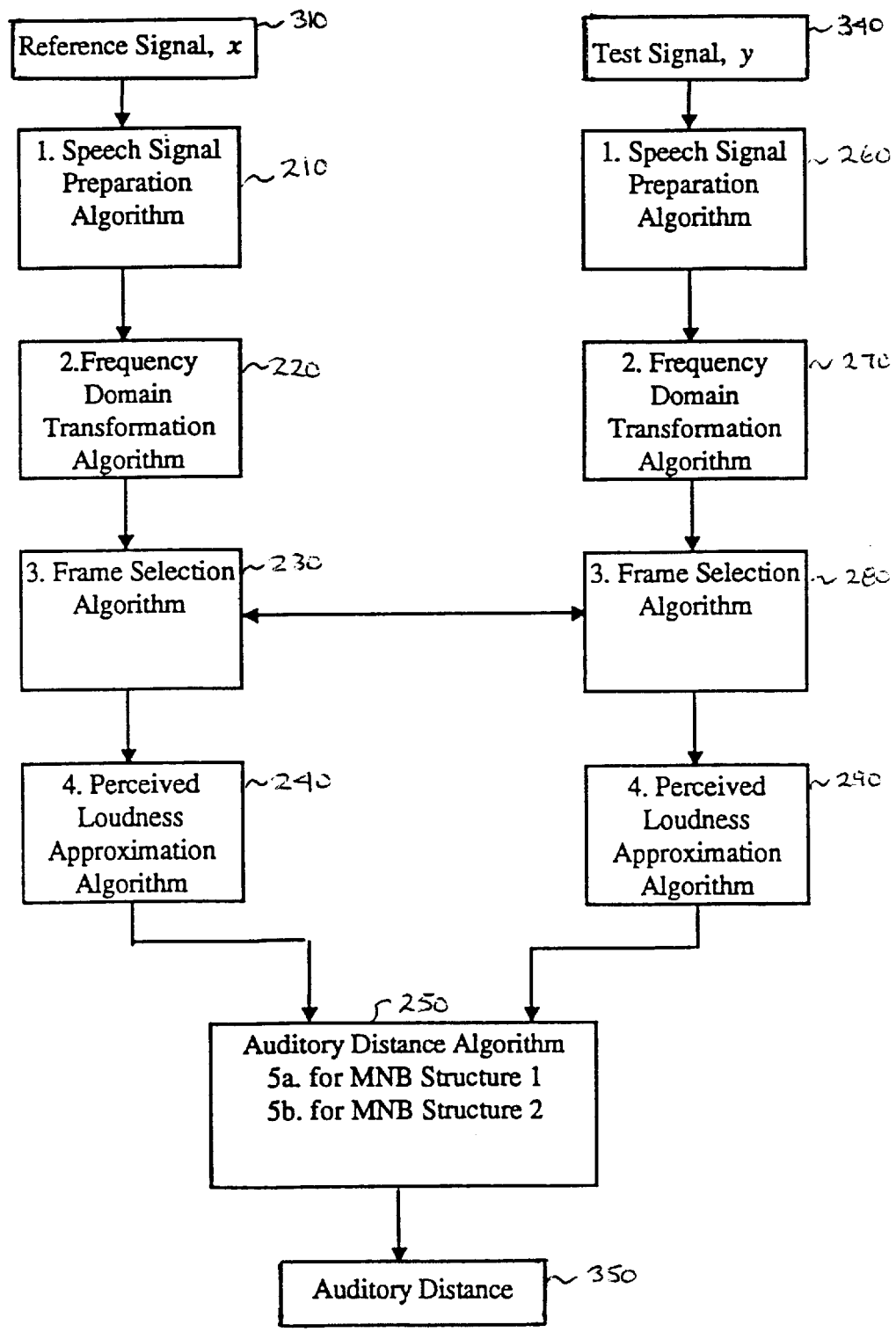
FIG. 2 is a flowchart illustrating the steps performed in computing auditory distance.

The two speech signals that are compared in these algorithms may be referred to as reference signal x 310 and test signal y 340, as illustrated in FIGS. 2 and 3. Because these algorithms are digital signal processing algorithms, they require that these signals be represented in a digital format. Typically, they will be stored in digital speech files.

The file called reference contains a digital representation of the reference signal, and the file called test contains a digital representation of the test signal. The sample rate may preferably be 8000 samples per second, and the recommended precision is at least 16 bits per sample. Lower precisions may be used, but there will be a corresponding loss of sensitivity in the AD values. Each input file must contain at least one second of speech signal. Files which contain only pauses in a natural conversation may not be useful. Files used in the development of these algorithms ranged from 3 to 9 seconds in duration.

It is assumed that the two files reference and test have the same length, and are synchronized. That is, any delay or time offset between the two signals has been removed. If these delays are known a priori, then they may be removed by proper timing during data acquisition. If these delays are not known a priori, then they must be estimated and then removed by editing one or both of the files. The audio signal time offset estimation algorithm discussed above may be suitably applied for this purpose.

GENERAL DESCRIPTION OF MNBs

The algorithms described here rely heavily on hierarchical structures of MNBs. MNBs were developed and used because existing techniques displayed properties that were clearly inconsistent with human auditory perception and judgment. MNBs allow for a family of analyses at multiple frequency and time scales, and spectral deviations at one scale are removed so they are not counted again as part of the deviations at other scales.

Figure 4:
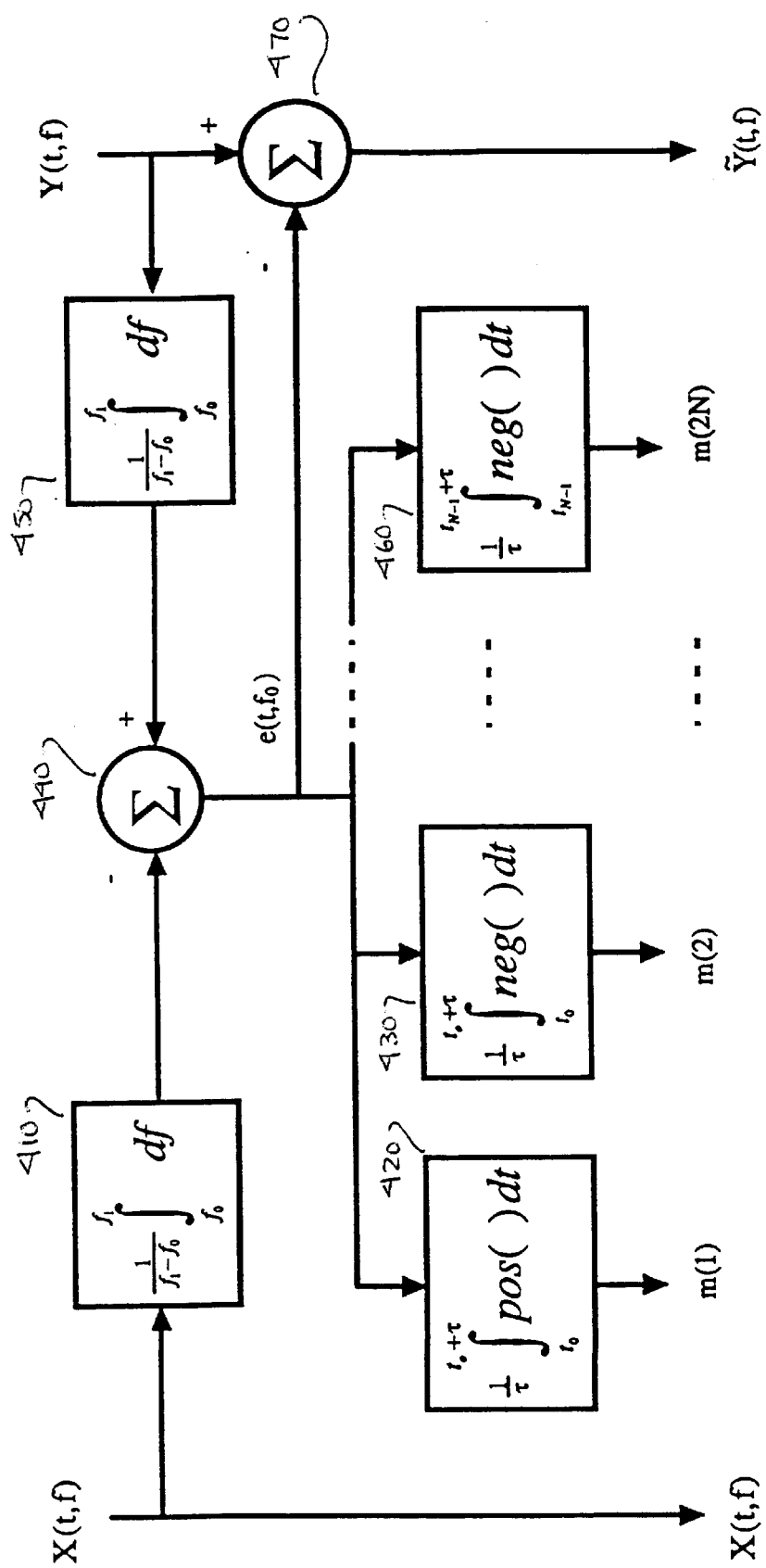
FIG. 4 is a block diagram illustrating the calculation steps in a time domain MNB.
Figure 5:
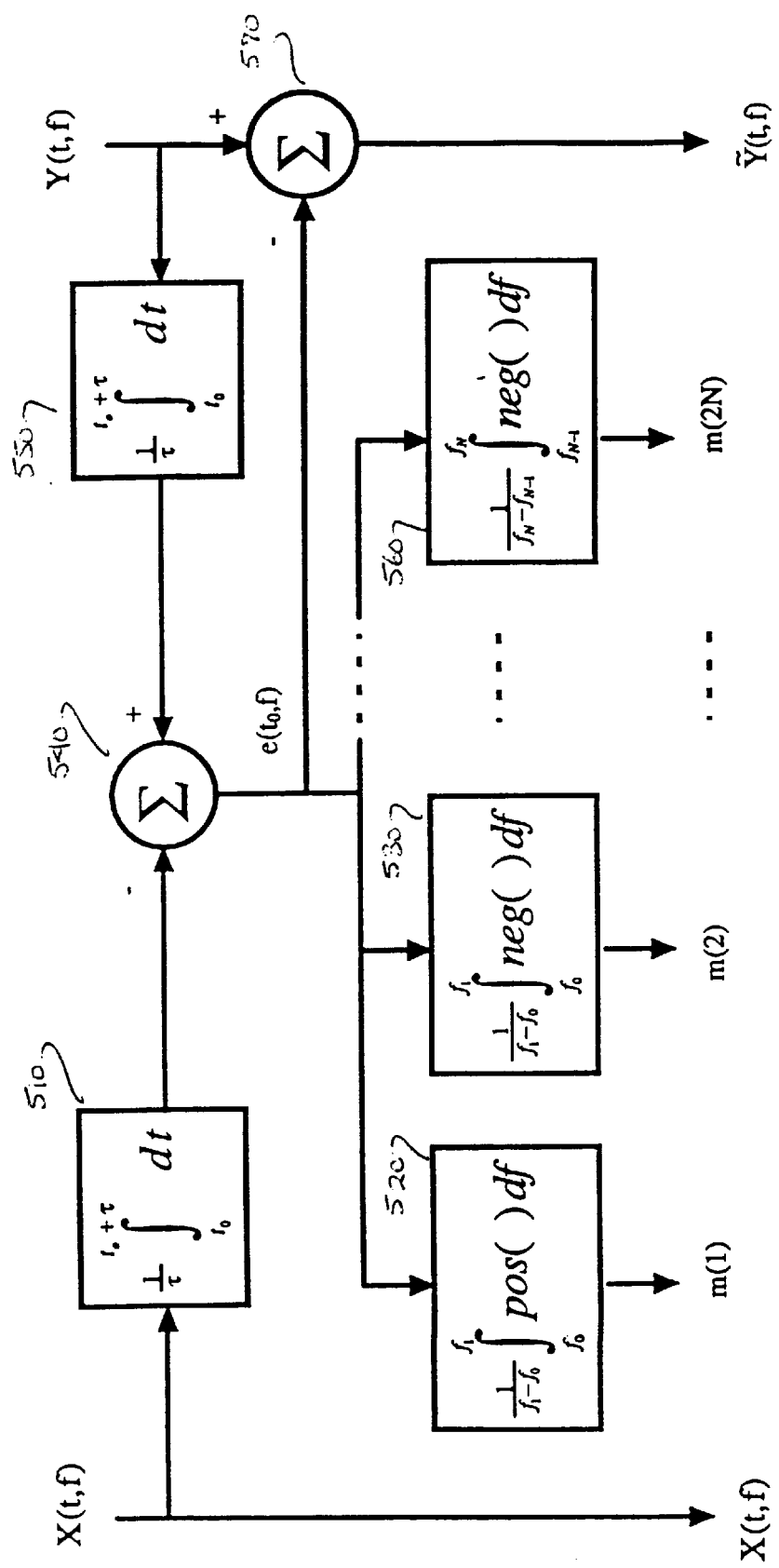
FIG. 5 is a block diagram illustrating the calculation steps in a frequency domain MNB.

There are two types of MNBs. One is the time measuring normalizing block (TMNB) as illustrated in FIG. 4, and the other is the frequency measuring normalizing block (FMNB) as illustrated in FIG. 5. Both the TMNB and the FMNB take two signals X(t,f) and Y(t,f) as inputs and returns them, and a set of measurements as outputs. The symbols t and f indicate that the signal samples are distributed over time and frequency. Y(t,f) is modified by the MNB, but X(t,f) is not modified by the MNB. The measurements are shown as m(1) m(2), . . . , m(2N) in FIGS. 4 and 5.

As illustrated in blocks 410 and 450 in FIG. 4, the TMNB integrates X and Y over some frequency scale, then measures the resulting differences (summation block 440) and normalizes Y at multiple times as illustrated by summation block 470. Finally, the positive and negative portions of the measurements are integrated over time as illustrated by blocks 420, 430, and 460.

In the FMNB of FIG. 5, the converse is true. The FMNB of FIG. 5 integrates X and Y over some time scale, as illustrated by blocks 510 and 550 then measures the resulting differences (summation block 540) and normalizes Y at multiple frequencies as illustrated by summation block 570. Finally, the positive and negative portions of the measurements are integrated over frequency as illustrated by blocks

520, 530, and 560. Any of the integrations may be approximated with finite sums when appropriate.

Figure 6:
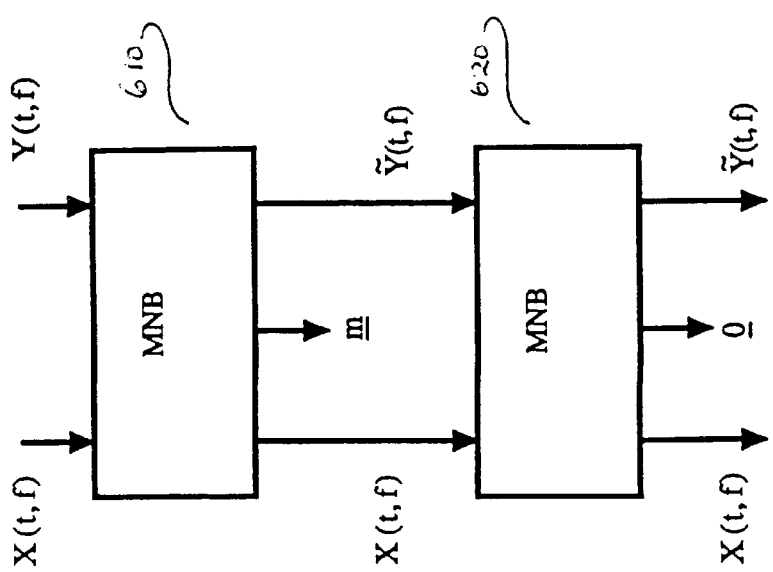
FIG. 6 is a block diagram illustrating the idempotency of both types of MNBs used in the present invention.

By design, both types of MNBs are idempotent. This important property is illustrated in FIG. 6. In FIG. 6, two passes through a given MNB are illustrated as blocks 610 and 620. FIG. 6 illustrates that a second pass through a given MNB will not further alter the Y signal, and that second pass will result in a measurement vector of zeros. The idempotency of MNBs allows them to be cascaded and yet measure the deviation at a given time or frequency scale once and only once. This idempotency relationship can be expressed as:

IF MNB(X(t,f),Y(t,f))=(X(t,f),Ỹ(t,f), m̄),

THEN MNB(X(t,f),Ỹ(t,f))=(X(t,f),Ỹ(t,f),Ō)

MNB ALGORITHMS FOR THE PERCEPTUALLY-CONSISTENT COMPARISON OF SPEECH SIGNALS

Two algorithms are described here and illustrated by the high level block diagram of FIG. 2. MNB Structure 1 is described by steps 210, 220, 230, 240, 260, 270, 280, 290, and portion 5a of step 250. MNB Structure 2 is described by steps 210, 220, 230, 240, 260, 270, 280, 290, and portion 5b of step 250.

Either algorithm may be applied to generate an auditory distance (AD) value which may be indicative of human perception of the sameness or difference between two signals.

1. Speech Signal Preparation Algorithm

In step 210, the contents of reference 310 are read into the vector x, and in step 260 the contents of test 340 are read into the vector y. The mean value is then removed from each of the N1 entries in each of these vectors, where N1 is the number of entries in each vector:

$$x(i) = x(i) - \frac{1}{N1} \cdot \sum_{j=1}^{N1} x(j), 1 \leq i \leq N1.$$

$$y(i) = y(i) - \frac{1}{N1} \cdot \sum_{j=1}^{N1} y(j), 1 \leq i \leq N1.$$

This eliminates any DC component that may be present in the test and reference signals. The DC component of a signal is inaudible and thus is irrelevant to determining perception of a signal.

Next, each of the vectors is normalized to a common RMS level:

$$x(i) = x(i) \cdot \left[ \frac{1}{N1} \sum_{j=1}^{N1} x(j)^2 \right]^{-\frac{1}{2}}, 1 \leq i \leq N1.$$

$$y(i) = y(i) \cdot \left[ \frac{1}{N1} \sum_{j=1}^{N1} y(j)^2 \right]^{-\frac{1}{2}}, 1 \leq i \leq N1.$$

This approximately removes any fixed gain in the DUT or the test set-up. Thus a fixed gain will not influence the values of AD produced by the technique of the present invention.

2. Frequency Domain Transformation Algorithm

In blocks 220 and 270, the resultant signals from blocks 210 and 260, respectively, are then transformed to the frequency domain using the FFT. The frame size is 128 samples, and the frame overlap is 50%. Any samples beyond the final full frame are discarded. Each frame of samples is multiplied (sample by sample) by the length 128 Hamming window:

$$w(i) = 0.54 - 0.46 \cos\left(\frac{2\pi i - 1}{127}\right), 1 \leq i \leq 128$$

After multiplication by the Hamming window, each frame is transformed to a 128 point frequency domain vector using the FFT. For each frame, the squared-magnitude of frequency samples 1 through 65 (DC through Nyquist) are retained. The results are stored in the matrices X and Y. These matrices contain 65 rows, and N2 columns, where N2 is the number of frames that are extracted from the N1 original samples in x and y.

Note that FFT scaling is not standardized. The FFT used in this algorithm should be scaled so that the following condition is met. When a frame of 128 real-valued samples, each with value 1 is input to the FFT without windowing, then the complex value in the DC bin of the FFT output must be 128 +0·j.

3. Frame Selection Algorithm

Blocks 230 and 280 represent the frame selection algorithm for both matrices X and Y, respectively. only frames that meet or exceed predetermined energy thresholds for both matrices X and Y are used in the calculation of AD. For matrix X, that energy threshold is set to 15 dB below the energy of the peak frame in matrix X:

$$xenergy(j) = \sum_{i=1}^{65} X(i, j)$$

$$xthreshold = 10^{-\frac{15}{10}} \cdot \max_{j}(xenergy(j))$$

For matrix Y, the energy threshold is set to 35 dB below the energy of the peak frame in matrix Y:

$$yenergy(j) = \sum_{i=1}^{65} Y(i, j)$$

$$ythreshold = 10^{-\frac{35}{10}} \cdot \max_{j}(yenergy(j))$$

Frames that meet or exceed both of these energy thresholds are retained:

xenergy (j)≦xthreshold AND yenergy(j)≦ythreshold
→frame j is retained.

If any frame contains one or more samples that are equal to zero, that frame is eliminated from both matrixes X and Y. Matrices X and Y now contain 65 rows, and N3 columns, where N3 is the number of frames that have been retained. If N3=0, the input files do not contain suitable signals and the algorithm is terminated.

4. Perceived Loudness Approximation Algorithm.

Each of the frequency domain samples in matrices X and Y are now logarithmically transformed to an approximation of perceived loudness as illustrated by blocks 240 and 290:

X(i,j)=10·log$_{10}$(X(i,j)), 1≦i≦65, 1≦j≦N3
Y(i,j)=10·log$_{10}$(Y(i,j)), 1≦i≦65, 1≦j≦N3

5a. Auditory Distance Algorithm for MNB Structure 1

Figure 7:
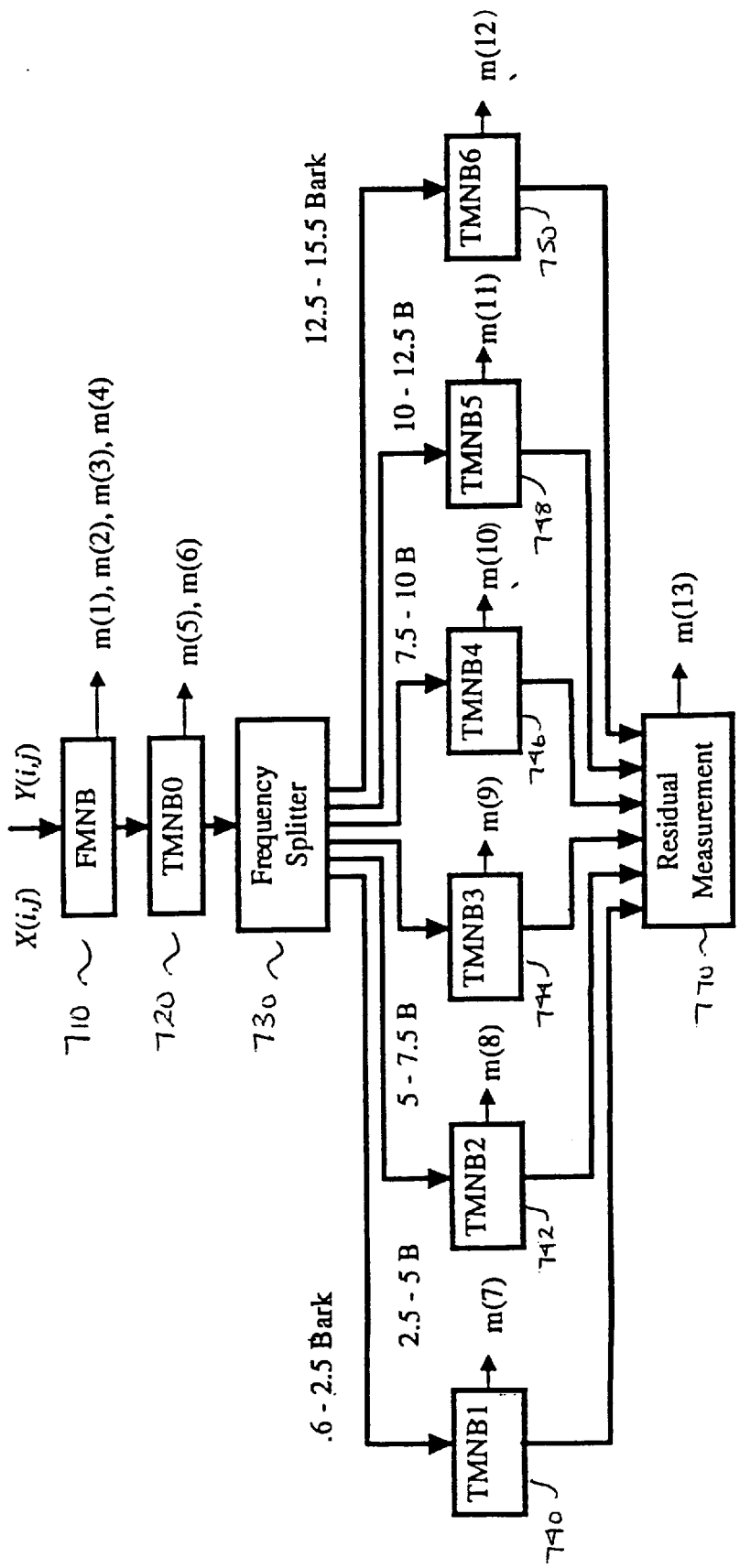
FIG. 7 is a block diagram of MNB structure 1.

The following steps describe the Auditory Distance Algorithm for MNB Structure 1 as represented by a portion of block 250. Note that either structure 1 (5a) or structure 2 (5b) may be employed. A block diagram of MNB structure 1 is provided in FIG. 7.

Frequency Measuring Normalizing Block

As illustrated by block 710, A frequency measuring normalizing block (FMNB) such as that illustrated in FIG. 5, is applied to matrices X and Y at the longest available time scale, defined by the length of the input files. Four measurements are extracted and stored in the measurement vector m. These measurements cover the lower and upper band edges of telephone band speech. Temporary vectors f1, f2, and f3 are used in the following five steps:

1. Measure:

$$f1(i) = \frac{1}{N3}\sum_{j=1}^{N3} Y(i,j) - \frac{1}{N3}\sum_{j=1}^{N3} X(i,j), 1 \le i \le 65,$$

2. Normalize measurement to 1 kHz:
   f2(i)=f1(i)−f1(17), 1≦i≦65
3. Normalize Y:
   Y(i,j)=Y(i,j)−f2(i), 1≦i≦65, 1≦j≦N3
4. Smooth the measurement:

$$f3(i) = \frac{1}{4}\sum_{j=1}^{4} f2(1 + 4\cdot(i-1) + j), 1 \le i \le 16$$

5. Save four measurements:
   m(1)=f3(1)
   m(2)=f3(2)
   m(3)=f3(13)
   m(4)=f3(14)

Time Measuring Normalizing Blocks

As represented in block 720, a time measuring normalizing block (TMNB), such as that illustrated in FIG. 4, is applied to matrices X and Y at the largest frequency scale (approximately 15 Bark). Six additional TMNBs represented by blocks 740, 742, 744, 746, 748, and 750 are then applied at a small scale (approximately 2–3 Bark) after passing through frequency splitter 730. Finally a residual measurement is made as illustrated by block 770.

Thus, there are a total of 7 TMNBs and 9 measurements generated. These 9 measurements are stored in the measurement vector m as illustrated in the following steps and as illustrated by blocks 720, 740, 742, 744, 746, 748, 750, and 770 of FIG. 7. Temporary variables t0, t1, . . . , t7 are used.

A. TMNB-0 Largest Scale (Full Band, 14.9 Bark wide)—720

1. Measure:

$$t0(j) = \frac{1}{64}\sum_{i=2}^{65} Y(i,j) - \frac{1}{64}\sum_{i=2}^{65} X(i,j), 1 \le j \le N3$$

2. Normalize Y:
   Y(i,j)=Y(i,j)−t0(j), 2≦i≦65, 1≦j≦N3
3. Save positive portion of measurement:

$$m(5) = \frac{1}{N3}\sum_{j=1}^{N3} \max(t0(j), 0)$$

4. Save negative portion of measurement:

$$m(6) = -\frac{1}{N3}\sum_{j=1}^{N3} \min(t0(j), 0)$$

B. TMNB-1 Small Scale (Band 1, 1.9 Bark wide)—740
1. Measure:

$$t1(j) = \frac{1}{5}\sum_{i=2}^{6} Y(i,j) - \frac{1}{5}\sum_{i=2}^{6} X(i,j), 1 \le j \le N3$$

2. Normalize Y:
   Y(i,j)=Y(i,j)−t1(j), 2≦i≦6, 1≦j≦5N3
3. Save positive portion of measurement:

$$m(7) = \frac{1}{N3}\sum_{j=1}^{N3} \max(t1(j), 0)$$

C. TMNB-2 Small Scale (Band 2, 2.5 Bark wide)—742
1. Measure:

$$t2(j) = \frac{1}{5}\sum_{i=7}^{11} Y(i,j) - \frac{1}{5}\sum_{i=7}^{11} X(i,j), 1 \le j \le N3$$

2. Normalize Y:
   Y(i,j)=Y(i,j)=t2(j), 7≦i≦11, 1≦j≦N3
3. Save positive portion of measurement:

$$m(8) = \frac{1}{N3}\sum_{j=1}^{N3} \max(t2(j), 0)$$

D. TMNB-3 Small Scale (Band 3, 2.5 Bark wide)—744
1. Measure $$t3(j) = \frac{1}{7}\sum_{i=12}^{18} Y(i,j) - \frac{1}{7}\sum_{i=12}^{18} X(i,j), 1 \le j \le N3$$

2. Normalize Y: Y(i,j)=Y(i,j)−t3(j), 12≦i≦18, 1≦j≦N3
3. Save positive portion of measurement:

$$m(9) = \frac{1}{N3}\sum_{j=1}^{N3} \max(t3(j), 0)$$

E. TMNB-4 Small Scale (Band 4, 2.5 Bark wide)—746
1. Measure:

$$t4(j) = \frac{1}{10}\sum_{i=19}^{28} Y(i,j) - \frac{1}{10}\sum_{i=19}^{28} X(i,j), 1 \le j \le N3$$

2. Normalize Y:
   Y(i,j)=Y(i,j)−t4(j), 19≦i≦28, 1≦j≦N3

3. Save positive portion of measurement:

$$m(10) = \frac{1}{N3}\sum_{j=1}^{N3}\max(t4(j), 0)$$

F. TMNB-5 Small Scale (Band 5, 2.5 Bark wide)—748:
1. Measure:

$$t5(j) = \frac{1}{14}\sum_{i=29}^{42} Y(i, j) - \frac{1}{14}\sum_{i=29}^{42} X(i, j), 1 \le j \le N3$$

2. Normalize Y:
Y(i,j)=Y(i,j)–t5(j), 29≦i≦42, 1≦j≦N3
3. Save positive portion of measurement:

$$m(11) = \frac{1}{N3}\sum_{j=1}^{N3}\max(t5(j), 0)$$

G. TMNB-6 Small Scale (Band 6, 3 Bark wide)—750
1. Measure:

$$t6(j) = \frac{1}{23}\sum_{i=43}^{65} Y(i, j) - \frac{1}{23}\sum_{i=43}^{65} X(i, j), 1 \le j \le N3$$

2. Normalize Y: Y(i,j)=Y(i,j)–t6(j), 43≦i≦65, 1≦j≦N3
3. Save positive portion of measurement:

$$m(12) = \frac{1}{N3}\sum_{j=1}^{N3}\max(t6(j), 0)$$

H. Residual Measurement—770
1. Measure residual:
t7(i,j)=Y(i,j)–X(i,j), 1≦i≦65, 1≦j≦N3
2. Save positive portion of measurement:

$$m(13) = \frac{1}{N3 \cdot 64}\sum_{i=2}^{65}\sum_{j=1}^{N3}\max(t7(i, j), 0)$$

Note that if two measurements (positive part and negative part) were retained for each of the 7 TMNBs in Structure 1, a total of 14 measurements would result. The hierarchical nature of MNB Structure 1, along with the idempotence of the MNB leads to linear dependence among these 14 measurements. Only 8 linearly independent TMNB measurements are available. These combine with the single residual measurement and the 4 FMNB measurements for a total of 13 measurements.

Linear Combination of Measurements for Structure 1

The 13 measurements now are combined linearly to generate an AD value. The weights used in this linear combination are given in Table 3:

TABLE 3

| i | wt(i) |
|---|---|
| 1 | 0.0010 |
| 2 | −0.0043 |
| 3 | −0.1289 |
| 4 | 0.1293 |
| 5 | 0.0989 |
| 6 | 0.0089 |
| 7 | 0.1129 |
| 8 | 1.0954 |
| 9 | 0.0013 |
| 10 | 0.0271 |
| 11 | 0.0118 |
| 12 | 0.0032 |
| 13 | 0.7859 |

An AD value is generated from the following equation using the weighting values of Table 3:

$$AD = \sum_{i=1}^{13} m(i) \cdot wt(i).$$

Note that when all 13 measurements are zero, AD is zero.

5b. Auditory Distance Algorithm for MNB Structure 2

Figure 8:
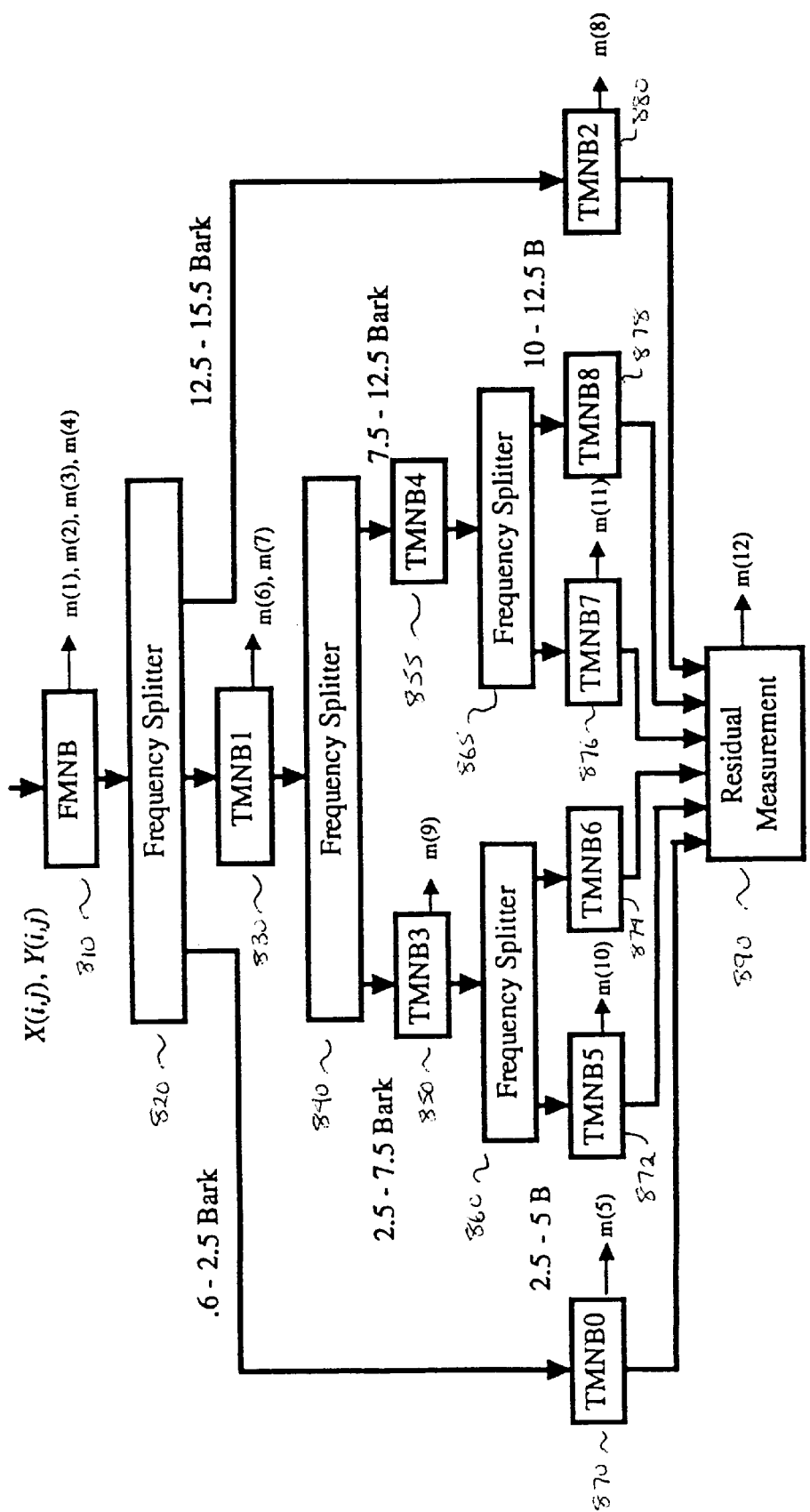
FIG. 8 is a block diagram of MNB structure 2.

The following steps describe the Auditory Distance Algorithm for MNB Structure 2. A block diagram is provided in FIG. 8.

Frequency Measuring Normalizing Block

As illustrated by block 810, an FMNB such as that illustrated in FIG. 5 is applied to matrices x and Y at the longest available time scale, defined by the length of the input files. Four measurements are extracted and stored in the measurement vector m. These measurements cover the lower and upper band edges of telephone band speech. Temporary vectors f1, f2, and f3 are used in the following steps:

1. Measure:

$$f1(i) = \frac{1}{N3}\sum_{j=1}^{N3} Y(i, j) - \frac{1}{N3}\sum_{j=1}^{N3} X(i, j), 1 \le i \le 65$$

2. Normalize measurement to 1 kHz:
f2(i)=f1(i)–f1(17), 1≦i≦65
3. Normalize Y:
Y(i,j)=Y(i,j)–f2(i), 1≦i≦65, 1≦j≦N3
4. Smooth the measurement:

$$f3(i) = \frac{1}{4}\sum_{j=1}^{4} f2(1 + 4 \cdot (i-1) + j), 1 \le i \le 16$$

5. Save four measurements:
m(1)=f3(1), m(2)=f3(2), m(3)=f3(13), m(4)=f3(14)

Time Measuring Normalizing Blocks

A frequency splitter (block 820) separates the extreme top and bottom portions of the band from the middle portion of the band. As represented by blocks 830, 850, 855, 872, 874, 876, and 878, TMNBs are applied to the middle portion of the band as it undergoes two levels of binary band splitting (blocks 840, 860, and 865), resulting in bands that are approximately 2–3 Bark wide. The extreme top and bottom portions of the band are each treated once by separate TMNBs as represented by blocks 870 and 880. Finally, a residual measurement is made as represented by block 890.

There are a total of 9 TMNBs and 8 measurements are generated. These 8 measurements are stored in the measurement vector m. Temporary variables t0, t1, . . . t9 are used.

A. TMNB-0 (Bottom of band, 1.9 Bark wide)—870
1. Measure:

$$t0(j) = \frac{1}{5}\sum_{i=2}^{6} Y(i,j) - \frac{1}{5}\sum_{i=2}^{6} X(i,j), i \leq j \leq N3$$

2. Normalize Y: Y(i,j)=Y(i,j)−t0(j), 2≦i≦6, 1≦j≦N3
3. Save positive portion of measurement:

$$m(5) = \frac{1}{N3}\sum_{j=1}^{N3} \max(t0(j), 0)$$

B. TMNB-1 (Middle of band, top layer, 10 Bark wide)—830
1. Measure:

$$t1(j) = \frac{1}{36}\sum_{i=7}^{42} Y(i,j) - \frac{1}{36}\sum_{i=7}^{42} X(i,j), 1 \leq j \leq N3$$

2. Normalize Y: Y(i,j)=Y(i,j)−tL(j), 7≦i≦42, 1≦j≦N3
3. Save positive portion of measurement:

$$m(6) = \frac{1}{N3}\sum_{j=1}^{N3} \max(t1(j), 0)$$

4. Save negative portion of measurement:

$$m(7) = -\frac{1}{N3}\sum_{j=1}^{N3} \min(t1(j), 0)$$

C. TMNB-2 (Top of Band, 3 Bark wide)—880
1. Measure:

$$t2(j) = \frac{1}{23}\sum_{i=43}^{65} Y(i,j) - \frac{1}{23}\sum_{i=43}^{65} X(i,j), 1 \leq j \leq N3$$

2. Normalize Y:
Y(i,j)=Y(i,j)−t2(j), 43≦i≦65, 1≦j≦5N3
3. Save positive portion of measurement:

$$m(8) = \frac{1}{N3}\sum_{j=1}^{N3} \max(t2(j), 0)$$

D. TMNB-3 (Middle of band, middle layer, 5 Bark wide) 850
1. Measure:

$$t3(j) = \frac{1}{12}\sum_{i=7}^{18} Y(i,j) - \frac{1}{12}\sum_{i=7}^{18} X(i,j), 1 \leq j \leq N3$$

2. Normalize Y:
Y(i, j)=Y(i, j)−t3(j), 7≦i≦18, 1≦j≦N3

3. Save positive portion of measurement:

$$m(9) = \frac{1}{N3}\sum_{j=1}^{N3} \max(t3(j), 0)$$

E. TMNB-4 (Middle of band, middle layer, 5 Bark wide) 855

$$t4(j) = \frac{1}{24}\sum_{i=19}^{42} Y(i,j) - \frac{1}{24}\sum_{i=19}^{42} X(i,j), 1 \leq j \leq N3$$

2. Normalize Y:
Y(i,j)=Y(i,j)−t4(j), 19≦i≦42, 1≦j≦N3
F. TMNB-5 (Middle of band, middle layer, 5 Bark wide) 872

$$t5(j) = \frac{1}{5}\sum_{i=7}^{11} Y(i,j) - \frac{1}{5}\sum_{i=7}^{11} ITALX(i,j), 1 \leq j \leq N3, \text{Measure}$$

Y(i,j)=Y(i,j)−t5(j), 7≦i≦11, 1≦j≦N3, Normalize Y $$m(10) = \frac{1}{N3}\sum_{j=1}^{N3} \max(t5(j), 0), \text{Save positive portion of measure}$$

G. TMNB-6 (Middle of band, middle layer, 5 Bark wide) 874
1. Measure:

$$t6(j) = \frac{1}{7}\sum_{i=12}^{18} Y(i,j) - \frac{1}{7}\sum_{i=12}^{18} X(i,j), 1 \leq j \leq N3$$

2. Normalize Y:
Y(i, j)=Y(i, j)−t6(j), 12≦i≦18, 1≦j≦5N3
H. TMNB-7 (Middle of band, bottom layer, 2.5 Bark wide) 876
1. Measure:

$$t7(j) = \frac{1}{10}\sum_{i=19}^{28} Y(i,j) - \frac{1}{10}\sum_{i=19}^{28} X(i,j), 1 \leq j \leq N3$$

2. Normalize Y:
Y(i,j)=Y(i,j)−t7(j), 19≦i≦28, 1≦j≦N3
3. Save positive portion of measurement:

$$m(11) = \frac{1}{N3}\sum_{j=1}^{N3} \max(t7(j), 0)$$

I. TMNB-8 (Middle of band, bottom layer, 2.5 Bark wide) 878
1. Measure:

$$t8(j) = \frac{1}{14}\sum_{i=29}^{42} Y(i,j) - \frac{1}{14}\sum_{i=29}^{42} X(i,j), 1 \leq j \leq N3$$

2. Normalize Y:
Y(i,j)=Y(i,j)−t8(j), 29≦i≦542, 1≦j≦N3
J. Residual Measurement 890
1. Measure residual:
t9(i,j)=Y(i,j)−X(i,j), 1≦i≦65, 1≦j≦N3

2. Save positive portion of residual measurement:

$$m(12) = \frac{1}{N3 \cdot 64} \sum_{i=2}^{65} \sum_{j=1}^{N3} \max(t9(i, j), 0)$$

Note that if two measurements (positive part and negative part) were retained for each of the 9 TMNBs in Structure 2, a total of 18 measurements would result. The hierarchical nature of MNB Structure 2, along with the idempotence of the MNB leads to linear dependence among these 18 measurements. Only 7 linearly independent TMNB measurements are available. These combine with the single residual measurement and the 4 FMNB measurements for a total of 12 measurements.

Linear Combination of Measurements for Structure 2

The 12 measurements now are combined linearly to generate an AD value. The weights used in this linear combination are given in Table 4:

TABLE 4

| i | wt(i) |
|---|---|
| 1 | 0.0000 |
| 2 | −0.0023 |
| 3 | −0.0684 |
| 4 | 0.0744 |
| 5 | 0.0142 |
| 6 | 0.0100 |
| 7 | 0.0008 |
| 8 | 0.2654 |
| 9 | 0.1873 |
| 10 | 2.2357 |
| 11 | 0.0329 |
| 12 | 0.0000 |

Using the weights from Table 4, the AD value is then calculated as follows:

$$AD = \sum_{i=1}^{12} m(i) \cdot wt(i)$$

Using the techniques described above, an AD value may thus be calculated comparing an input reference signal and an a test signal output from a piece of equipment under test. As described above, the relative value of AD is proportional to the human perception of whether the two signals sound similar.

As one of ordinary skill in the art may appreciate, the technique of the present invention may be embodied in computer software, hardware, or a combination of software and hardware devices. In the preferred embodiment of the present invention, the present invention may be embodied in signal processing software utilizing the equations set forth above.

In particular, the present invention has been implemented using MATLAB™ signal processing emulation software to demonstrate the workability of the present invention. Attached in the APPENDIX is a copy of software for the MATLAB™ signal processing program implementing the present invention. The inventor envisions that the present invention may preferable be implemented using modules of code written in C, C++ or other variations of that language.

Moreover, the present invention may also be implemented in hardware, both as a custom ASIC, or as individual signal processing hardware elements coupled together accordingly. Thus, it should be understood that the various blocks illustrated in the drawings may alternatively represent program modules, method steps or suitably programmed hardware modules, without departing from the spirit and scope of the present invention.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A method for measuring differences between two speech signals consistent with human auditory perception and judgement, said method comprising the steps of:

preparing, using a digital signal processor element programmed with a speech signal preparation algorithm, digital representations of two speech signals for further processing, transforming the digital representations of the two speech signals using a digital signal processor element programmed with a frequency domain transformation algorithm to segment the digital representations of the two speech signals into respective groups of frames, and transforming the respective groups of frames into the frequency domain, selecting frames using a digital signal processor element programmed with a frame selection algorithm to select frequency-domain frames for further processing, measuring perceived loudness of selected frames using a digital signal processor element programmed with a perceived loudness approximation algorithm, and comparing, using a digital signal processor element programmed with an auditory distance algorithm to compare measured loudness values for at least two selected frequency-domain frames each corresponding to a respective one of the two speech signals and generate a numerical result representing auditory distance;

wherein the auditory distance value is directly proportional to human auditory perception of the difference between the two speech signals, wherein said step of preparing comprises the steps of:
converting a first of the two speech signals from analog to digital form and storing the digital form as a first vector x, and
converting a second of the two speech signals from analog to digital form and storing the digital form as a second vector y, wherein said transforming step comprises the steps of:
generating a plurality of frames for each of the x and y vectors, respectively,
transforming each frame to a frequency domain vector, and
storing each frequency domain vector in respective matrices X and Y, wherein said step of selecting frames comprises the steps of:
selecting only frames that meet or exceed predetermined energy thresholds, and wherein said step of selecting only frames that meet or exceed predetermined energy thresholds comprises the steps of:

for matrix X, selecting only frames which meet or exceed an energy threshold xthreshold of substantially 15 dB below an energy level xenergy of a peak frame in matrix X:

$$xenergy(j) = \sum_{i=1}^{65} X(i, j)$$

$$xthreshold = 10^{-\frac{15}{10}} \cdot \max_j(xenergy(j))$$

for matrix Y, selecting only frames which meet or exceed an energy threshold ythreshold of substantially 35 dB below an energy level yenergy of a peak frame in matrix Y:

$$yenergy(j) = \sum_{i=1}^{65} Y(i, j)$$

$$ythreshold = 10^{-\frac{35}{10}} \cdot \max_j(yenergy(j)).$$

2. A method for measuring differences between two speech signals consistent with human auditory perception and Judgment, said method comprising the steps of:
- preparing, using a digital signal processor element programmed with a speech signal preparation algorithm, digital representations of two speech signals for further processing,
- transforming the digital representations of the two speech signals using a digital signal processor element programmed with a frequency domain transformation algorithm to segment the digital representations of the two speech signals into respective groups of frame, and transforming the respective groups of frames into the frequency domain,
- selecting frames using a digital signal processor element programmed with a frame selection algorithm to select frequency-domain frames for further processing,
- measuring perceived loudness of selected frames using a digital signal processor element programmed with a perceived loudness approximation algorithm, and
- comparing, using a digital signal processor element programmed with an auditory distance algorithm to compare measured loudness values for at least two selected frequency-domain frames each corresponding to a respective one of the two speech signals and generate a numerical result representing auditory distance;
- wherein the auditory distance value is directly proportional to human auditory perception of the difference between the two speech signals,
- wherein said step of preparing comprises the steps of:
- converting a first of the two speech signals from analog to digital form and storing the digital form as a first vector x; and
- converting a second of the two speech signals from analog to digital form and storing the digital form as a second vector y,
- wherein said transforming step comprises the steps of:
- generating a plurality of frames for each of the x and v vectors, respectively,
- transforming each frame to a frequency domain vector, and
- storing each frequency domain vector in respective matrices X and Y, and
- wherein said comparing step comprises the step of applying a frequency measuring normalizing block to matrices X and Y.

3. The method of claim 2, wherein said step of applying a frequency measuring normalizing block to matrices X and Y further comprises the steps of: measuring values f1:

$$f1(i) = \frac{1}{N3}\sum_{j=1}^{N3} Y(i, j) - \frac{1}{N3}\sum_{j=1}^{N3} X(i, j), 1 \le i \le 65,$$

generating values f2 normalized to 1 kHz:

f2(i)=f1(i)−f1(17), 1≦i≦65, normalizing the Y matrix using the normalized f2 values:

Y(i,j)=Y(i,j)−f2(i), 1≦i≦65, 1j≦N3, smoothing the measurement as values f3:

$$f3(i) = \frac{1}{4}\sum_{j=1}^{4} f2(1 + 4 \cdot (i-1) + j), 1 \le i \le 16$$

and saving four of the f3 values in matrix M:

m(1)=f3(1)

m(2)=f3(2)

m(3)=f3(13)

m(4)=f3(14).

4. The method of claim 3, wherein said comparing step further comprises the step of:
- applying a time measuring normalizing block to matrices X and Y at a largest frequency scale of substantially 15 Bark.

5. The method of claim 4, wherein said step of comparing further comprises the steps of applying additional time measuring normalizing blocks at a small scale of substantially 2–3 Bark.

6. The method of claim 5, wherein said step of comparing further comprises the step of making a residual measurement of any residual values.

7. The method of claim 6, wherein said step of applying a time measuring normalizing block to matrices X and Y at a largest frequency scale of substantially 15 Bark comprises the step of applying a time measuring normalizing block at a scale of 0.6 to 15.5 Bark comprising the steps of:

measuring values t0:

$$t0(j) = \frac{1}{64}\sum_{i=2}^{65} Y(i, j) - \frac{1}{64}\sum_{i=2}^{65} X(i, j), 1 \le j \le N3$$

normalizing the Y matrix using the measured to values:

Y(i,j)=Y(i,j)−t0(j), 2≦i≦65, 1≦j≦N3, saving a positive portion of the measured to values in matrix M:

$$m(5) = \frac{1}{N3}\sum_{j=1}^{N3} \max(t0(j), 0)$$

and saving a negative portion of measured t0 values in matrix M:

$$m(6) = -\frac{1}{N3}\sum_{j=1}^{N3} \min(t0(j), 0).$$

8. The method of claim 7, wherein said steps of applying additional time measuring normalizing blocks at a small scale of substantially 2–3 Bark comprises the step of applying a time measuring normalizing block at a scale of 0.6 to 2.5 Bark comprising the steps of:

measuring values t1:

$$t1(j) = \frac{1}{5}\sum_{i=2}^{6} Y(i, j) - \frac{1}{5}\sum_{i=2}^{6} X(i, j), 1 \le j \le N3$$

normalizing the Y matrix using the normalized t1 values:
Y(i, j)=Y(i, j)−t1(j), 2≦i≦6, 1≦j≦N3, and
saving a positive portion of the measured t1 values in matrix M:

$$m(7) = \frac{1}{N3}\sum_{j=1}^{N3} \max(t1(j), 0).$$

9. The method of claim 8, wherein said steps of applying additional time measuring normalizing blocks at a small scale of substantially 2–3 Bark further comprises the step of applying a time measuring normalizing block at a scale of 2.5 to 5 Bark comprising the steps of:

measuring values t2:

$$t2(j) = \frac{1}{5}\sum_{i=7}^{11} Y(i, j) - \frac{1}{5}\sum_{i=7}^{11} X(i, j), 1 \le j \le N3$$

normalizing the Y matrix using the normalized t2 values:
Y(i,j)=Y(i,j)−t2(j), 7≦i≦11, 1≦j≦N3, and
saving a positive portion of the measured t2 values in matrix M:

$$m(8) = \frac{1}{N3}\sum_{j=1}^{N3} \max(t2(j), 0).$$

10. The method of claim 9, wherein said steps of applying additional time measuring normalizing blocks at a small scale of substantially 2–3 Bark further comprises the step of applying a time measuring normalizing block at a scale of 5 to 7.5 Bark comprising the steps of:

measuring values t3:

$$t3(j) = \frac{1}{7}\sum_{i=12}^{18} Y(i, j) - \frac{1}{7}\sum_{i=12}^{18} X(i, j), 1 \le j \le N3$$

normalizing the Y matrix using the normalized t3 values:
Y(i,j)=Y(i,j)−t3(j), 12≦i≦18, 1≦j≦5N3, and saving a positive portion of the measured t3 values in matrix M:

$$m(9) = \frac{1}{N3}\sum_{j=1}^{N3} \max(t3(j), 0).$$

11. The method of claim 10, wherein said steps of applying additional time measuring normalizing blocks at a small scale of substantially 2–3 Bark further comprises the step of applying a time measuring normalizing block at a scale of 7.5 to 10 Bark comprising the steps of: measuring values t4:

$$t4(j) = \frac{1}{10}\sum_{i=19}^{28} Y(i, j) - \frac{1}{10}\sum_{i=19}^{28} X(i, j), 1 \le j \le N3$$

normalizing the Y matrix using the normalized t4 values:
Y(i,j)=Y(i,j)−t4(j), 19≦i≦28, 1≦j≦N3, and
saving a positive portion of the measured t4 values in matrix M:

$$m(10) = \frac{1}{N3}\sum_{j=1}^{N3} \max(t4(j), 0).$$

12. The method of claim 11, wherein said steps of applying additional time measuring normalizing blocks at a small scale of substantially 2–3 Bark further comprises the step of applying a time measuring normalizing block at a scale of 10 to 12.5 Bark comprising the steps of:

measuring values t5:

$$t5(j) = \frac{1}{14}\sum_{i=29}^{42} Y(i, j) - \frac{1}{14}\sum_{i=29}^{42} X(i, j), 1 \le j \le N3$$

normalizing the Y matrix using the normalized t5 values:
Y(i,j)=Y(i,j)−t5(j), 29≦i≦42, 1≦j≦N3, and
saving a positive portion of the measured t5 values in matrix M:

$$m(11) = \frac{1}{N3}\sum_{j=1}^{N3} \max(t5(j), 0).$$

13. The method of claim 12, wherein said steps of applying additional time measuring normalizing blocks at a small scale of substantially 2–3 Bark further comprises the step of applying a time measuring normalizing block at a scale of 12.5 to 15.5 Bark comprising the steps of:

measuring values t6:

$$t6(j) = \frac{1}{23}\sum_{i=43}^{65} Y(i, j) - \frac{1}{23}\sum_{i=43}^{65} X(i, j), 1 \le j \le N3$$

normalizing the Y matrix using the normalized t6 values:
Y(i,j)=Y(i,j)−t6(j), 43≦i≦65, 1≦j≦N3, and
saving a positive portion of the measured t6 values in matrix M:

$$m(12) = \frac{1}{N3}\sum_{j=1}^{N3} \max t6(j), 0).$$

14. The method of claim 13, wherein said step of making a residual measurement of any residual values further comprises the steps of:
measuring residual t7 values:
t7(i,j)=Y(i,j)−X(i,j), 1≦i≦65, 1≦j≦N3, and
saving a positive portion of the measured residual t7 values in matrix M:

$$m(13) = \frac{1}{N3 \cdot 64}\sum_{i=2}^{65}\sum_{j=1}^{N3} \max(t7(i, j), 0).$$

15. The method of claim 14, wherein said comparing step further comprising the steps of:
linearly combining measurements mi(1) through m(13)to value.

16. The method of claim 15, wherein said step of linearly combining measurements m(1) through m(13) to generate an auditory distance value comprises the step of generating an auditory distance value AD from the equation:

$$AD = \sum_{i=1}^{13} m(i) \cdot wt(i).$$

where wt(1) through wt(13) represent weighting factors.

17. The method of claim 16, wherein weighting factors wt(1) through wt(13) are given by:

| i | wt(i) |
|---|---|
| 1 | 0.0010 |
| 2 | −0.0043 |
| 3 | −0.1289 |
| 4 | 0.1293 |
| 5 | 0.0989 |
| 6 | 0.0089 |
| 7 | 0.1129 |
| 8 | 1.0954 |
| 9 | 0.0013 |
| 10 | 0.0271 |
| 11 | 0.0118 |
| 12 | 0.0032 |
| 13 | 0.7859 |

18. The method of claim 3, wherein said comparing step further comprises the steps of:
applying a time measuring normalizing block of substantially 10 Bark wide to matrices X and Y in a central portion of the band,
applying time measuring normalizing blocks of substantially 5 Bark wide to matrices X and Y in a central portion of the band,
applying a plurality of time measuring normalizing blocks of substantially 2–3 Bark wide to matrices X and Y in a middle portion of the band,
applying separate time measuring normalizing blocks to extreme top and bottom portions of the band, and making a residual measurement of remaining values.

19. The method of claim 18, wherein said step of applying a separate time measuring normalizing block to an extreme bottom portion of the band to matrices X and Y comprises the step of applying a time measuring normalizing block at a scale of 0.6 to 2.5 Bark comprising the steps of:
measuring values t0:

$$t0(j) = \frac{1}{5}\sum_{i=2}^{6} Y(i, j) - \frac{1}{5}\sum_{i=2}^{6} X(i, j), 1 \le j \le N3$$

normalizing the Y matrix using the normalized to values:
Y(i,j)=Y(i,j)−t0(j), 2≦i≦6, 1≦j≦N3, and
saving a positive portion of the measured to values in matrix M:

$$m(5) = \frac{1}{N3}\sum_{j=1}^{N3} \max(t0(j), 0).$$

20. The method of claim 19, wherein said step of applying a time measuring normalizing block of substantially 10 Bark wide to matrices X and Y in a central portion of the band comprises the step of applying a time measuring normalizing block at a scale of 2.5 to 12.5 Bark comprising the steps of:
measuring values t1:

$$t1(j) = \frac{1}{36}\sum_{i=7}^{42} Y(i, j) - \frac{1}{36}\sum_{i=7}^{42} X(i, j), 1 \le j \le N3$$

normalizing the Y matrix using the normalized t1 values:
Y(i,j)=Y(i,j)−t1(j), 7≦i≦42, 1≦j≦N3, and
saving a positive portion of the measured t1 values in matrix M:

$$m(6) = \frac{1}{N3}\sum_{j=1}^{N3} \max(t1(j), 0)$$

saving a negative portion of the measured t1 values in matrix M:

$$m(7) = -\frac{1}{N3}\sum_{j=1}^{N3} \min(t1(j), 0).$$

21. The method of claim 20 wherein said step of applying a separate time measuring normalizing block to an extreme top portion of the band to matrices X and Y comprises the step of applying a time measuring normalizing block at a scale of 12.5 to 15.5 Bark comprising the steps of:
measuring values t2:

$$t2(j) = \frac{1}{23}\sum_{i=43}^{65} Y(i, j) - \frac{1}{23}\sum_{i=43}^{65} X(i, j), 1 \le j \le N3$$

normalizing the Y matrix using the normalized t2 values:
Y(i,j)=Y(i,j)−t2(j), 43≦i≦65, 1≦j≦N3, and
saving a positive portion of the measured t2 values in matrix M:

$$m(8) = \frac{1}{N3}\sum_{j=1}^{N3}\max(t2(j), 0).$$

22. The method of claim 21, wherein said step of applying time measuring normalizing blocks of substantially 5 Bark wide to matrices X and Y in a central portion of the band comprises the step of applying a time measuring normalizing block at a scale of 2.5 to 7.5 Bark comprising the steps of:

measuring values t3:

$$t3(j) = \frac{1}{12}\sum_{i=7}^{18} Y(i, j) - \frac{1}{12}\sum_{i=7}^{18} X(i, j), 1 \le j \le N3$$

normalizing the Y matrix using the normalized t3 values:
Y(i,j)=Y(i,j)−t3(j), 7≦i≦8, 1≦j≦N3
saving a positive portion of the measured t3 values in matrix M:

$$m(9) = \frac{1}{N3}\sum_{j=1}^{N3}\max(t3(j), 0).$$

23. The method of claim 22, wherein said step of applying time measuring normalizing blocks of substantially 5 Bark wide to matrices X and Y in a central portion of the band comprises the step of applying a time measuring normalizing block at a scale of 7.5 to 12.5 Bark comprising the steps of:

measuring values t4:

$$t4(j) = \frac{1}{24}\sum_{i=19}^{42} Y(i, j) - \frac{1}{24}\sum_{i=19}^{42} X(i, j), 1 \le j \le N3$$

and normalizing the Y matrix using the normalized t4 values:
Y(i,j)=Y(i,j)−4(j), 19≦i≦42, 1≦j≦N3.

24. The method of claim 23, wherein said step of applying a plurality of time measuring normalizing blocks of substantially 2–3 Bark wide to matrices X and Y in a middle portion of the band comprises the step of applying a time measuring normalizing block at a scale of 2.5 to 5 Bark comprising the steps of:

measuring values t5:

$$t5(j) = \frac{1}{5}\sum_{i=7}^{11} Y(i, j) - \frac{1}{5}\sum_{i=7}^{11} X(i, j), 1 \le j \le N3, \text{Measure}$$

normalizing the Y matrix using the normalized t5 values:
Y(i,j)=Y(i,j)−t5(j), 7≦i≦11, 1≦j≦N3, and
saving a positive portion of the measured t5 values in matrix M:

$$m(10) = \frac{1}{N3}\sum_{j=1}^{N3}\max(t5(j), 0).$$

25. The method of claim 24, wherein said step of applying a plurality of time measuring normalizing blocks of substantially 2–3 Bark wide to matrices X and Y in a middle portion of the band further comprises the step of applying a time measuring normalizing block at a scale of 5 to 7.5 Bark comprising the steps of:

measuring values t6:

$$t6(j) = \frac{1}{7}\sum_{i=12}^{18} Y(i, j) - \frac{1}{7}\sum_{i=12}^{18} X(i, j), 1 \le j \le N3$$

and normalizing the Y matrix using the normalized t6 values:
Y(i,j)=Y(i,j)−t6(j), 12≦i≦8, 1≦j≦N3.

26. The method of claim 25, wherein said step of applying a plurality of time measuring normalizing blocks of substantially 2–3 Bark wide to matrices X and Y in a middle portion of the band further comprises the step of applying a time measuring normalizing block at a scale of 7.7 to 10 Bark comprising the steps of: measuring values t7:

$$t7(j) = \frac{1}{10}\sum_{i=19}^{28} Y(i, j) - \frac{1}{10}\sum_{i=19}^{28} X(i, j), 1 \le j \le N3$$

normalizing the Y matrix using the normalized t7 values:
Y(i,j)=Y(i,j)−t7(j), 19≦i≦28, 1≦j≦N3, and
saving a positive portion of the measured to values in matrix M:

$$m(11) = \frac{1}{N3}\sum_{j=1}^{N3}\max(t7(j), 0).$$

27. The method of claim 26, wherein said step of applying a plurality of time measuring normalizing blocks of substantially 2–3 Bark wide to matrices X and Y in a middle portion of the band further comprises the step of applying a time measuring normalizing block at a scale of 10 to 12.5 Bark comprising the steps of:

measuring values t8:

$$t8(j) = \frac{1}{14}\sum_{i=29}^{42} Y(i, j) - \frac{1}{14}\sum_{i=29}^{42} X(i, j), 1 \le j \le N3$$

and normalizing the Y matrix using the normalized t8 values:
Y(i,j)=Y(i,j)−t8(j), 29≦i≦42, 1≦j≦N3.

28. The method of claim 27, wherein said step of making a residual measurement of any residual values further comprises the steps of:

measuring residual values t9:
t9(i,j)=Y(i,j)−X(i,j), 1≦i≦65, 1≦j≦N3, and
saving a positive portion of the measured residual values t9 in matrix M:

$$m(12) = \frac{1}{N3 \cdot 64}\sum_{i=2}^{65}\sum_{j=1}^{N3}\max(t9(i, j), 0).$$

29. The method of claim 28, wherein said comparing step further comprises the steps of:
linearly combining measurements m(1) through m(12) to generate an auditory distance value.

30. The method of claim 29, wherein said step of linearly combining measurements m(1) through m(12) to generate an auditory distance value comprises the step of generating an auditory distance value AD from the equation:

$$AD = \sum_{i=1}^{12} m(i) \cdot wt(i)$$

where wt(1) through wt(12) represent weighting factors.

31. The method of claim 29, wherein weighting factors wt(1) through wt(12) are given by:

| i | wt(i) |
|---|---|
| 1 | 0.0000 |
| 2 | −0.0023 |
| 3 | −0.0684 |
| 4 | 0.0744 |
| 5 | 0.0142 |
| 6 | 0.0100 |
| 7 | 0.0008 |
| 8 | 0.2654 |
| 9 | 0.1873 |
| 10 | 2.2357 |
| 11 | 0.0329 |
| 12 | 0.0000 |

32. An apparatus for measuring differences between two speech signals consistent with human auditory perception and Judgment, said apparatus comprising:

first means for preraring digital representations of two speech signals for further processing;

second means, coupled to the first means, for transforming the digital representations of the two speech signals to segment the digital representations of the two speech signals into respective groups of frames, and transforming the respective groups of frames into the frequency domain;

third means, coupled to the second means, for selecting frequency-domain frames for further processing; and fourth means, coupled to the third means, for measuring perceived loudness of selected frames, and fifth means, coupled to the fourth means, for comparing measured loudness values for at least two selected frequency-domain frames each corresponding to a respective one of the two speech signals and generate a numerical result representing auditory distance;

wherein the auditory distance value is directly proportional to human auditory perception of the difference between the two speech signals, wherein said first means comprises:

means for converting a first of the two speech signals from analog to digital form and storing the digital form as a first vector x; and means for converting a second of the two speech signals from analog to digital form and storing the digital form as a second vector y, wherein said second means comprises:

means for generating a plurality of frames for each of the x and v vectors. respectively;

means for transforming each frame to a frequency domain vector; and means for storing each frequency domain vector in respective matrices X and Y.

wherein said third means selects only frames that meet or exceed predetermined energy thresholds, and wherein third means selects only frames that meet or exceed predetermined energy thresholds determined as:

for matrix X, selecting only frames which meet or exceed an energy threshold xthreshold of substantially 15 dB below an energy level xenergy of a peak frame in matrix X:

$$xenergy(j) = \sum_{i=1}^{65} X(i,j)$$

$$xthreshold = 10^{-\frac{15}{10}} \cdot \max_{j}(xenergy(j))$$

for matrix Y, selecting only frames which meet or exceed an energy threshold ythreshold of substantially 35 dB below an energy level yenergy of a peak frame in matrix Y:

$$yenergy(j) = \sum_{i=1}^{65} Y(i,j)$$

$$ythreshold = 10^{-\frac{35}{10}} \cdot \max_{j}(yenergy(j)).$$

33. A apparatus of for measuring differences between two speech signals consistent with human auditory perception and Judgment, said apparatus comprising:

first means for preparing digital representations of two speech signals for further processing;

second means, coupled to the first means, for transforming the digital representations of the two speech signals to segment the digital representations of the two speech signals into respective groups of frames, and transforming the respective croups of frames into the frequency domain;

third means, coupled to the second means, for selecting frequency-domain frames for further processing; and fourth means, coupled to the third means, for measuring perceived loudness of selected frames, and fifth means, coupled to the fourth means, for comparing measured loudness values for at least two selected frequency-domain frames each corresponding to a respective one of the two speech signals and generate a numerical result representing auditory distance;

wherein the auditory distance value is directly proportional to human auditory perception of the difference between the two speech signals, wherein said first means comprises:

means for converting a first of the two speech signals from analog to digital form and storing the digital form as a first vector x; and means for converting a second of the two speech signals from analog to digital form and storing the digital form as a second vector y, wherein said second means comprises:

means for generating a plurality of frames for each of the x and y vectors, respectively;

means for transforming each frame to a frequency domain vector; and means for storing each frequency domain vector in respective matrices X and Y, and wherein said fifth means comprises means for applying a frequency measuring normalizing block to matrices X and Y.

34. The apparatus of claim 33, wherein said means for applying a frequency measuring normalizing block to matrices X and Y further comprises:

means for measuring values f1:

$$f1(i) = \frac{1}{N3}\sum_{j=1}^{N3} Y(i,j) - \frac{1}{N3}\sum_{j=1}^{N3} X(i,j), 1 \le i \le 65,$$

means for generating values f2 normalized to 1 kHz:

f2(i)=f1(i)−f1(17), 1≦i≦65, means for normalizing the Y matrix using the normalized f2 values:

Y(i,j)=Y(i,j)−f2(i), 1≦i≦65, 1≦j≦N3, means for smoothing the measurement as values f3:

$$f3(i) = \frac{1}{4}\sum_{j=1}^{4} f2(1 + 4 \cdot (i-1) + j), 1 \le i \le 16$$

and means for saving four of the f3 values in matrix M:

m(1)=f3(1)

m(2)=f3(2)

m(3)=f3(13)

m(4)=f3(14).

35. The apparatus of claim 34, wherein said fifth means further comprises means for applying a time measuring normalizing block to matrices X and Y at a largest frequency scale of substantially 15 Bark.

36. The apparatus of claim 35, wherein said fifth means further comprises applying additional time measuring normalizing blocks at a small scale of substantially 2–3 Bark.

37. The apparatus of claim 36, wherein said fifth means further comprises means for making a residual measurement of any residual values.

38. The apparatus of claim 37, wherein said means for applying a time measuring normalizing block to matrices X and Y at a largest frequency scale of substantially 15 Bark comprises means for applying a time measuring normalizing block at a scale of 0.6 to 15.5 Bark comprising:

means for measuring values t0:

$$t0(j) = \frac{1}{64}\sum_{i=2}^{65} Y(i,j) - \frac{1}{64}\sum_{i=2}^{65} X(i,j), 1 \le j \le N3$$

means for normalizing the Y matrix using the measured values:

Y(i,j)=Y(i,j)−t0(j), 2≦i≦65, 1≦j≦N3, means for saving a positive portion of the measured t0 values in matrix m:

$$m(5) = \frac{1}{N3}\sum_{j=1}^{N3} \max(t0(j), 0)$$

and means for saving a negative portion of measured t0 values in matrix M:

$$m(6) = -\frac{1}{N3}\sum_{j=1}^{N3} \max(t0(j), 0).$$

39. The apparatus of claim 38, wherein said means for applying additional time measuring normalizing blocks at a small scale of substantially 2–3 Bark comprises means for applying a time measuring normalizing block at a scale of 0.6 to 2.5 Bark comprising:

means for measuring values t1:

$$t1(j) = \frac{1}{5}\sum_{i=2}^{6} Y(i,j) - \frac{1}{5}\sum_{i=2}^{6} X(i,j), 1 \le j \le N3$$

means for normalizing the Y matrix using the normalized t1 values:

Y(i,j)=Y(i,j)−t1(j), 2≦i≦6, 1≦j≦N3, and means for saving a positive portion of the measured t1 values in matrix M:

$$m(7) = \frac{1}{N3}\sum_{j=1}^{N3} \max(t1(j), 0).$$

40. The apparatus of claim 39, wherein said means for applying additional time measuring normalizing blocks at a small scale of substantially 2–3 Bark further comprises means for applying a time measuring normalizing block at a scale of 2.5 to 5 Bark comprising:

means for measuring values t2:

$$t2(j) = \frac{1}{5}\sum_{i=7}^{11} Y(i,j) - \frac{1}{5}\sum_{i=7}^{11} X(i,j), 1 \le j \le N3$$

means for normalizing the Y matrix using the normalized t2 values:

Y(i,j)=Y(i,j)−t2(j), 7≦i≦11, 1≦j≦N3, and means for saving a positive portion of the measured t2 values in matrix M:

$$m(8) = \frac{1}{N3}\sum_{j=1}^{N3} \max(t2(j), 0).$$

41. The apparatus of claim 40, wherein said means for applying additional time measuring normalizing blocks at a small scale of substantially 2–3 Bark further comprises means for applying a time measuring normalizing block at a scale of 5 to 7.5 Bark comprising:

means for measuring values t3:

$$t3(j) = \frac{1}{7}\sum_{i=12}^{18} Y(i,j) - \frac{1}{7}\sum_{i=12}^{18} X(i,j), 1 \le j \le N3$$

means for normalizing the Y matrix using the normalized t3 values:

Y(i,j)=Y(i,j)−t3(j), 12≦i≦18, 1≦j≦5N3, and means for saving a positive portion of the measured t3 values in matrix M:

$$m(9) = \frac{1}{N3}\sum_{j=1}^{N3}\max(t3(j), 0).$$

42. The apparatus of claim 41, wherein said means for applying additional time measuring normalizing blocks at a small scale of substantially 2–3 Bark further comprises means for applying a time measuring normalizing block at a scale of 7.5 to 10 Bark comprising:

means for measuring values t4:

$$t4(j) = \frac{1}{10}\sum_{i=19}^{28}Y(i,j) - \frac{1}{10}\sum_{i=19}^{28}X(i,j), 1 \le j \le N3$$

means for normalizing the Y matrix using the normalized t4 values:

Y(i,j)=Y(i,j)−t4(j), 19≦i≦28, 1≦j≦N3, and means for saving a positive portion of the measured t4 values in matrix M:

$$m(10) = \frac{1}{N3}\sum_{j=1}^{N3}\max(t4(j), 0).$$

43. The apparatus of claim 42, wherein said means for applying additional time measuring normalizing blocks at a small scale of substantially 2–3 Bark further comprises means for applying a time measuring normalizing block at a scale of 10 to 12.5 Bark comprising:

means for measuring values t5:

$$t5(j) = \frac{1}{14}\sum_{i=29}^{42}Y(i,j) - \frac{1}{14}\sum_{i=29}^{42}X(i,j), 1 \le j \le N3$$

means for normalizing the Y matrix using the normalized t5 values:

Y(i,j)=Y(i,j)−t5(j), 29≦i≦42, 1≦j≦N3, and means for saving a positive portion of the measured t5 values in matrix M:

$$m(11) = \frac{1}{N3}\sum_{j=1}^{N3}\max(t5(j), 0).$$

44. The apparatus of claim 43, wherein said means for applying additional time measuring normalizing blocks at a small scale of substantially 2–3 Bark further comprises means for applying a time measuring normalizing block at a scale of 12.5 to 15.5 Bark comprising:

means for measuring values t6:

$$t6(j) = \frac{1}{23}\sum_{i=43}^{65}Y(i,j) - \frac{1}{23}\sum_{i=43}^{65}X(i,j), 1 \le j \le N3$$

means for normalizing the Y matrix using the normalized t6 values:

Y(i,j)=Y(i,j)−t6(j), 43≦i≦65, 1≦j≦N3, and means for saving a positive portion of the measured t6 values in matrix M:

$$m(12) = \frac{1}{N3}\sum_{j=1}^{N3}\max t6(j), 0).$$

45. The apparatus of claim 44, wherein said means for making a residual measurement of any residual values further comprises:

means for measuring residual t7 values:

t7(i,j)=Y(i,j)−X(i,j), 1≦i≦65, 1≦j≦N3, and means for saving a positive portion of the measured residual t7 values in matrix M:

$$m(13) = \frac{1}{N3 \cdot 64}\sum_{i=2}^{65}\sum_{j=1}^{N3}\max(t7(i,j), 0).$$

46. The apparatus of claim 45, wherein said fifth means further comprises means for linearly combining measurements m(1) through m(13) to generate an auditory distance value.

47. The apparatus of claim 46, wherein said means for linearly combining measurements m(1) through m(13) to generate an auditory distance value comprises means for generating an auditory distance value AD from the equation:

where wt(1) through wt(13) represent weighting factors.

| i | wt(i) |
|---|---|
| 1 | 0.0010 |
| 2 | −0.0043 |
| 3 | −0.1289 |
| 4 | 0.1293 |
| 5 | 0.0989 |
| 6 | 0.0089 |
| 7 | 0.1129 |
| 8 | 1.0954 |
| 9 | 0.0013 |
| 10 | 0.0271 |
| 11 | 0.0118 |
| 12 | 0.0032 |
| 13 | 0.7859 |

48. The apparatus of claim 47, wherein weighting factors are given by:

$$AD = \sum_{i=1}^{13} m(i) \cdot wt(i).$$

49. The apparatus of claim 34, wherein said fifth means further comprises:

means for applying a time measuring normalizing block of substantially 10 Bark wide to matrices X and Y in a central portion of the band;

means for applying time measuring normalizing blocks of substantially 5 Bark wide to matrices X and Y in a central portion of the band;

means for applying a plurality of time measuring normalizing blocks of substantially 2–3 Bark wide to matrices X and Y in a middle portion of the band;

means for applying separate time measuring normalizing blocks to extreme top and bottom portions of the band; and means for making a residual measurement of remaining values.

50. The apparatus of claim 49, wherein said means for applying a separate time measuring normalizing block to an extreme bottom portion of the band to matrices X and Y comprises means for applying a time measuring normalizing block at a scale of 0.6 to 2.5 Bark comprising:
means for measuring values t0:

$$t0(j) = \frac{1}{5}\sum_{i=2}^{6} Y(i,j) - \frac{1}{5}\sum_{i=2}^{6} X(i,j), 1 \le j \le N3$$

means for normalizing the Y matrix using the normalized t0 values:
Y(i, j)=Y(i, j)−t0 (j), 2≦i≦6, 1:j≦N3, and
means for saving a positive portion of the measured t0 values in matrix M:

$$m(5) = \frac{1}{N3}\sum_{j=1}^{N3} \max(t0(j), 0).$$

51. The apparatus of claim 50, wherein said means for applying a time measuring normalizing block of substantially 10 Bark wide to matrices X and Y in a central portion of the band comprises means for applying a time measuring normalizing block at a scale of 2.5 to 12.5 Bark comprising:
means for measuring valuest 1:

$$t1(j) = \frac{1}{36}\sum_{i=7}^{42} Y(i,j) - \frac{1}{36}\sum_{i=7}^{42} X(i,j), 1 \le j \le N3$$

means for normalizing the Y matrix using the normalized t1 values:
Y(i, j)=Y(i, j)−t1(j), 7≦i≦42, 1≦j≦N3, and
means for saving a positive portion of the measuredt1values in matrix M:

$$m(6) = \frac{1}{N3}\sum_{j=1}^{N3} \max(t1(j), 0)$$

means for saving a negative portion of the measured t1 values in matrix M:

$$m(7) = -\frac{1}{N3}\sum_{j=1}^{N3} \min(t1(j), 0).$$

52. The apparatus of claim 51, wherein said means for applying a separate time measuring normalizing block to an extreme top portion of the band to matrices X and Y comprises means for applying a time measuring normalizing block at a scale of 12.5 to 15.5 Bark comprising:
means for measuring values t2:

$$t2(j) = \frac{1}{23}\sum_{i=43}^{65} Y(i,j) - \frac{1}{23}\sum_{i=43}^{65} X(i,j), 1 \le j \le N3$$

means for normalizing the Y matrix using the normalized t2 values:
Y(i,j)=Y(i,j)−t2(j) 43≦i≦65, 1≦j≦N3, and
means for saving a positive portion of the measured t2 values in matrix M:

$$m(8) = \frac{1}{N3}\sum_{j=1}^{N3} \max(t2(j), 0).$$

53. The apparatus of claim 52, wherein said means for applying time measuring normalizing blocks of substantially 5 Bark wide to matrices X and Y in a central portion of the band comprises means for applying a time measuring normalizing block at a scale of 2.5 to 7.5 Bark comprising:
means for measuring values t3:

$$t3(j) = \frac{1}{12}\sum_{i=7}^{18} Y(i,j) - \frac{1}{12}\sum_{i=7}^{18} X(i,j), 1 \le j \le N3$$

means for normalizing the Y matrix using the normalized t3 values:
Y(i, j)=Y(i, j)−t3 (j), 7≦i≦18, 1≦j≦N3
means for saving a positive portion of the measured t3 values in matrix M:

$$m(9) = \frac{1}{N3}\sum_{j=1}^{N3} \max(t3(j), 0).$$

54. The apparatus of claim 53 wherein said means for applying time measuring normalizing blocks of substantially 5 Bark wide to matrices X and Y in a central portion of the band comprises means for applying a time measuring normalizing block at a scale of 7.5 to 12.5 Bark comprising:
means for measuring values t4:

$$t4(j) = \frac{1}{24}\sum_{i=19}^{42} Y(i,j) - \frac{1}{24}\sum_{i=19}^{42} X(i,j), 1 \le j \le N3$$

and means for normalizing the Y matrix using the normalized t4 values:
Y(i,j)=Y(i,j)−t4(j), 19≦i≦42, 1≦j≦N3.

55. The apparatus of claim 54, wherein said means for applying a plurality of time measuring normalizing blocks of substantially 2–3 Bark wide to matrices X and Y in a middle portion of the band comprises means for applying a time measuring normalizing block at a scale of 2.5 to 5 Bark comprising:
means for measuring values t5:

$$t5(j) = \frac{1}{5}\sum_{i=7}^{11} Y(i,j) - \frac{1}{5}\sum_{i=7}^{11} X(i,j), 1 \le j \le N3, \text{Measure}$$

means for normalizing the Y matrix using the normalized t5 values:
Y(i,j)=Y(i,j)−t5(j), 7≦i≦11, 1≦j≦N3, and
means for saving a positive portion of the measured tS values in matrix M:

$$m(10) = \frac{1}{N3}\sum_{j=1}^{N3} \max(t5(j), 0).$$

56. The apparatus of claim 55, wherein said means for applying a plurality of time measuring normalizing blocks of substantially 2–3 Bark wide to matrices X and Y in a middle portion of the band further comprises means for applying a time measuring normalizing block at a scale of 5 to 7.5 Bark comprising:

means for measuring values t6:

$$t6(j) = \frac{1}{7}\sum_{i=12}^{18} Y(i, j) - \frac{1}{7}\sum_{i=12}^{18} X(i, j), 1 \le j \le N3$$

and means for normalizing the Y matrix using the normalized t6 values:

Y(i,j)=Y(i,j)−t6(j), 12≦i≦18, 1≦j≦5N3.

57. The apparatus of claim 56, wherein said means for applying a plurality of time measuring normalizing blocks of substantially 2–3 Bark wide to matrices X and Y in a middle portion of the band further comprises means for applying a time measuring normalizing block at a scale of 7.7 to 10 Bark comprising:

means for measuring values t7:

$$t7(j) = \frac{1}{10}\sum_{i=19}^{28} Y(i, j) - \frac{1}{10}\sum_{i=19}^{28} X(i, j), 1 \le j \le N3$$

means for normalizing the Y matrix using the normalized t7 values:

Y(i,j)=Y(i,j)−t7(j), 19≦i≦28, 1≦j≦N3, and means for saving a positive portion of the measured t0 values in matrix M:

$$m(11) = \frac{1}{N3}\sum_{j=1}^{N3} \max(t7(j), 0).$$

58. The apparatus of claim 57, wherein said means for applying a plurality of time measuring normalizing blocks of substantially 2–3 Bark wide to matrices X and Y in a middle portion of the band further comprises means for applying a time measuring normalizing block at a scale of 10 to 12.5 Bark comprising:

means for measuring values t8:

$$t8(j) = \frac{1}{14}\sum_{i=29}^{42} Y(i, j) - \frac{1}{14}\sum_{i=29}^{42} X(i, j), 1 \le j \le N3$$

and means for normalizing the Y matrix using the normalized t8 values:

Y(i,j)=Y(i,j)−t8(j), 29≦i≦42, 1≦j≦5N3.

59. The apparatus of claim 58, wherein said means for making a residual measurement of any residual values further comprises:

means for measuring residual values t9:

t9(i,j)=Y(i,j)−X(i,j), 1≦i≦565, 1≦j≦5N3; and means for saving a positive portion of the measured residual values t9 in matrix M:

$$m(12) = \frac{1}{N3 \cdot 64}\sum_{i=2}^{65}\sum_{j=1}^{N3} \max(t9(i, j), 0).$$

60. The apparatus of claim 59 wherein said fifth means further comprises means for linearly combining measurements m(1) through m(12) to generate an auditory distance value.

61. The apparatus of claim 60, wherein said means for linearly combining measurements m(1) through m(12) to generate an auditory distance value comprises means for generating an auditory distance value AD from the equation:

$$AD = \sum_{i=1}^{12} m(i) \cdot wt(i)$$

where wt(1) through wt(12) represent weighting factors.

62. The apparatus of claim 61, wherein weighting factors are given by:

| i | wt(i) |
|---|---|
| 1 | 0.0000 |
| 2 | −0.0023 |
| 3 | −0.0684 |
| 4 | 0.0744 |
| 5 | 0.0142 |
| 6 | 0.0100 |
| 7 | 0.0008 |
| 8 | 0.2654 |
| 9 | 0.1873 |
| 10 | 2.2357 |
| 11 | 0.0329 |
| 12 | 0.0000 |

63. A computer readable memory for directing a computer to measure differences between two speech signals consistent with human auditory perception and judgment, said computer readable memory comprising:

a first memory portion containing instructions for preparing digital representations of two speech signals for further processing, a second memory portion containing instructions for transforming the digital representations of the two speech signals to segment the digital representations of the two speech signals into respective croups of frames, and transforming the respective groups of frames into the freauencv domain, a third memory portion containing instructions for selecting frequency-domain frames for further processing, a fourth memory portion containing instructions for measuring perceived loudness of selected frames, and a fifth memory portion containing instructions for comparing measured loudness values for at least two selected freguency-domain frames each corresponding to a respective one of the two speech signals and generate a numerical result representing auditory distance;

wherein the auditory distance value is directly proportional to human auditory perception of the difference between the two speech signals, wherein said first memory portion comprises:
instructions for converting a first of the two speech signals from analog to digital form and storing the digital form as a first vector x, and
instructions for converting a second of the two speech signals from analog to digital form and storing the digital form as a second vector y, wherein said transforming step comprises:
instructions for generating a plurality of frames for each of the x and v vectors, respectively,
instructions for transforming each frame to a frequency domain vector, and instructions for storing each frequency domain vector in respective matrices X and Y, wherein said instructions for selecting frames comprises: instructions for selecting only frames that meet or exceed predetermined energy thresholds, and wherein said instructions for selecting only frames that meet or exceed predetermined energy thresholds comprises instructions for:

for matrix X, selecting only frames which meet or exceed an energy threshold xthreshold of substantially 15 dB below an energy level xenergy of a peak frame in matrix X:

$$xenergy(j) = \sum_{i=1}^{65} X(i,j)$$

$$xthreshold = 10^{-\frac{15}{10}} \cdot \max_j(xenergy(j))$$

for matrix Y, selecting only frames which meet or exceed an energy threshold ythreshold of substantially 35 dB below an energy level yenergy of a peak frame in matrix Y:

$$yenergy(j) = \sum_{i=1}^{65} Y(i,j)$$

$$ythreshold = 10^{-\frac{35}{10}} \cdot \max_j(yenergy(j)).$$

64. A computer readable memory directing a computer to measure differences between two speech signals consistent with human auditory perception and judgment, said computer readable memory comprising:
- a first memory portion containing instructions for preparing digital representations of two speech signals for further processing,
- a second memory portion containing instructions for transforming the digital representations of the two speech signals to segment the digital representations of the two speech signals into respective groups of frames, and transforming the respective groups of frames into the frequency domain,
- a third memory portion containing instructions for selecting frequency-domain frames for further processing,
- a fourth memory portion containing instructions for measuring perceived loudness of selected frames, and
- a fifth memory portion containing instructions for comparing measured loudness values for at least two selected frequency-domain frames each corresponding to a respective one of the two speech signals and generate a numerical result representing auditory distance;
- wherein the auditory distance value is directly proportional to human auditory perception of the difference between the two speech signals,
- wherein said first memory portion comprises:
- instructions for converting a first of the two speech signals from analog to digital form and storing the digital form as a first vector x, and
- instructions for converting a second of the two speech signals from analog to digital form and storing the digital form as a second vector y, wherein said transforming step comprises:
- instructions for generating a plurality of frames for each of the x and y vectors, respectively,
- instructions for transforming each frame to a frequency domain vector, and
- instructions for storing each frequency domain vector in respective matrices X and Y, and
- wherein said comparing step comprises the instructions for applying a frequency measuring normalizing block to matrices x and Y.

65. The computer readable memory of claim 64, wherein said instructions for applying a frequency measuring normalizing block to matrices X and Y further comprises:

instructions for measuring values f1:

$$f1(i) = \frac{1}{N3}\sum_{j=1}^{N3} Y(i,j) - \frac{1}{N3}\sum_{j=1}^{N3} X(i,j), 1 \le i \le 65,$$

instructions for generating values f2 normalized to 1 kHz:

f2(i)=f1(i)−f1(17), $1 \le j \le 65$, instructions for normalizing the Y matrix using the normalized f2 values:

Y(i,j) Y(i,j)−f2(i), $1 \le i \le 65$, $1 \le j \le N3$, instructions for smoothing the measurement as values f3:

$$f3(i) = \frac{1}{4}\sum_{j=1}^{4} f2(1 + 4 \cdot (i-1) + j), 1 \le i \le 16$$

and instructions for saving four of the f3 values in matrix M:

m(1)=f3(1)

m(2)=f3(2)

m(3)=f3(13)

m(4)=f3(14).

66. The computer readable memory of claim 65, wherein said comparing step further comprises:
- instructions for applying a time measuring normalizing block of substantially 10 Bark wide to matrices X and Y in a central portion of the band,
- instructions for applying time measuring normalizing blocks of substantially 5 Bark wide to matrices X and Y in a central portion of the band,
- instructions for applying a plurality of time measuring normalizing blocks of substantially 2–3 Bark wide to matrices X and Y in a middle portion of the band,
- instructions for applying separate time measuring normalizing blocks to extreme top and bottom portions of the band, and
- instructions for making a residual measurement of remaining values.

* * * * *